(12) United States Patent
Hu et al.

(10) Patent No.: US 12,486,241 B2
(45) Date of Patent: Dec. 2, 2025

(54) CYSTINE DIAMIDE ANALOGS FOR CYSTINURIA

(71) Applicant: Rutgers, The State University of New Jersey, New Brunswick, NJ (US)

(72) Inventors: Longqin Hu, Belle Mead, NJ (US); Haifa Albanyan, Riyadh (SA)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 743 days.

(21) Appl. No.: 17/757,244

(22) PCT Filed: Dec. 11, 2020

(86) PCT No.: PCT/US2020/064583
§ 371 (c)(1),
(2) Date: Jun. 13, 2022

(87) PCT Pub. No.: WO2021/119475
PCT Pub. Date: Jun. 17, 2021

(65) Prior Publication Data
US 2023/0043330 A1 Feb. 9, 2023

Related U.S. Application Data

(60) Provisional application No. 62/947,799, filed on Dec. 13, 2019.

(51) Int. Cl.
| | |
|---|---|
| *C07D 295/185* | (2006.01) |
| *C07C 323/41* | (2006.01) |
| *C07D 211/58* | (2006.01) |
| *C07D 241/04* | (2006.01) |
| *C07D 295/13* | (2006.01) |
| *C07D 471/10* | (2006.01) |

(52) U.S. Cl.
CPC ........ *C07D 295/185* (2013.01); *C07C 323/41* (2013.01); *C07D 211/58* (2013.01); *C07D 241/04* (2013.01); *C07D 295/13* (2013.01); *C07D 471/10* (2013.01)

(58) Field of Classification Search
CPC .. C07D 471/10; C07D 295/13; C07D 241/04; C07D 295/185; C07D 211/58; C07D 323/41; C07C 323/41
See application file for complete search history.

(56) References Cited

U.S. PATENT DOCUMENTS

| | | |
|---|---|---|
| 5,661,129 A | 8/1997 | Feelisch et al. |
| 5,801,175 A | 9/1998 | Afonso et al. |
| 6,034,135 A | 3/2000 | Schwartz et al. |
| 6,214,827 B1 | 4/2001 | Afonso et al. |
| 9,428,453 B2 | 8/2016 | Hu et al. |
| 10,836,737 B2 | 11/2020 | Hu et al. |
| 2009/0124667 A1 | 5/2009 | Ansorge et al. |
| 2014/0187546 A1 | 7/2014 | Hu et al. |
| 2023/0043330 A1 | 2/2023 | Hu et al. |

FOREIGN PATENT DOCUMENTS

| | | |
|---|---|---|
| JP | 2005-529959 A | 10/2005 |
| WO | 2021119475 A1 | 6/2021 |

OTHER PUBLICATIONS

Registry No. 639066-12-9, File Registry on STN, entered STN: Jan. 19, 2004.*
Registry No. 53267-39-3, File Registry on STN, entered STN Nov. 16, 1984.
Registry No. 7729-20-6, File Registry on STN, entered STN Nov. 16, 1984.
Bhuyan et al., "Antioxidant Activity of Peptide-Based Angiotensiin Converting Enzyme Inhibitors", Org. Biomol. Chem., 2012, 10, 2237-2247.
Burth, et al: "New Tripodal N3S Ligands and Some Zinc Complexes Thereof", Eur. J. Inorg. Chem., 1998, 1759-1764.
Menger, et al., "Anatomy of a Gel. Amino Acid Derivatives That Rigidify Water at Submillimolar Concentrations", J. Am. Chem. Soc. 2000, 122, 11679-11691.
Pubchem, SID 32606358, Available Date: Dec. 5, 2007 [retrieved on Jan. 11, 2021]. Retrieved from the Internet: <URL: https://pubchem.ncbi.nlm.nih.gov/substance/32606358>.
Ranganathan, et al.: "Norbomene-Constrained Cyclic Peptides with Hairpin Architecture: Design, Synthesis, Conformation, and Membrane Ion Transport", J. Org. Chem., 2000, vol. 65, 365-374.
Yang, et al: "Design, synthesis, and evaluation of L-cystine diamides as L-cystine crystallization inhibitors for cystinuria", Bioorganic & Medicinal Chemistry Letters 28 (2018) pp. 1303-1308, https://doi.org/10.1016/j.bmcl.2018.03.024.
Lioe et al: "A Novel Salt Bridge Mechanism Highlights the Need for Nonmobile Proton Conditions to Promote Disulfide Bond Cleavage in Protonated Peptides Under Low-Energy Collisional Activation", Journal of the American Society for Mass Spectrometry, (2007), 18(6), pp. 1109-1123.
Allen et al: "A semisynthetic epitope for kinase substrates", Nature Methods, (Jun. 2007), 4(6), pp. 511-516.
Sharma et al: "Synthesis and Anticancer Activity of Some L-Cystine Derivatives", Indian Journal of Pharmaceutical Sciences, (May-Jun. 2002), 64(3), 200-204.
Takagi et al: "Circular dichroism of a model compound of L-cystine residue. N,N'-diacetyl-L-cystine bismethylamide", Biochimica et Biophysica Acta, Protein Structure, (1973), 310(1), pp. 11-19.
Poloni et al: "Role of Molecular Recognition in L-Cystine Crystal Growth Inhibition", Crystal Growth & Design, (2017), 17(5), 2767-2781.
Hu et al: L-Cystine Diamides as L-Cystine Crystallization Inhibitors for Cystinuria, Journal of Medicinal Chemistry, (2016), 59(15), pp. 7293-7298.

\* cited by examiner

*Primary Examiner* — Rebecca L Anderson
(74) *Attorney, Agent, or Firm* — FOX ROTHSCHILD LLP

(57) ABSTRACT

This document discloses novel cystine analogs, methods of making cystine analogs, compositions containing cystine analogs and methods of using such analogs for inhibiting cystine stone formation and treatment of cystinuria.

20 Claims, 4 Drawing Sheets

CDME

*meso*-CDME (LH1728)

CYSTINE DIAMIDE ANALOGS FOR CYSTINURIA

FEDERALLY SPONSORED RESEARCH

This invention was made with government support under grant number DK112782 awarded by The National Institutes of Health. The government has certain rights in the invention.

TECHNICAL FIELD

This patent document relates to novel cystine analogs, methods of making cystine analogs, compositions containing cystine analogs and methods of using such analogs for inhibiting cystine stone formation and treatment of cystinuria.

BACKGROUND

Cystinuria is a rare chronic lifelong condition that affects about 20,000 Americans. It is the result of an autosomal recessive disorder caused by mutations in one of the two genes, either SLC3A1 or SLC7A9, leading to abnormal transport of dibasic amino acids from the luminal fluid of the renal proximal tubules and small intestine. About 5% of American women and 12% of American men will develop a kidney stone at some time in their lifetime, and prevalence has been rising in both sexes.

Kidney stone recurrence is also common. It is estimated that almost 50% of stone formers will have a recurrence within 10 years. Approximately 59% of kidney stones are calcium oxalate stones (pure) or with small amounts of calcium phosphate; 10% are predominantly calcium phosphate stones; 17% are uric acid stones; 12% are struvite or infection stones; and remaining 2% are cystine and other stones. Although the rate of cystine stones is much lower than calcium oxalate stones, cystine stones are larger, recur more frequently, and are more likely to cause chronic kidney disease. Medically, the disease caused by cystine stones in the kidney, ureter, and bladder is named cystinuria, which is a genetic abnormality results in abnormal transport of dibasic amino acids from the luminal fluid of the renal proximal tubules and small intestine.

Cystinuria is a chronic, lifelong condition and is most common in young adults under age 40. It is the result of an autosomal recessive disorder caused by mutations in one of the two genes, either SLC3A1 on chromosome 2 (type A) or SLC7A9 on chromosome 19 (type B), which code for components of the major proximal renal tubule cystine and dibasic amino acid transporter. Current clinical treatment of cystinuria aims to reduce the concentration of free cystine in urine and to increase its solubility. A high fluid intake of around 4-5 liters a day and alkalinization of urine pH with citrate or bicarbonate salt can suppress but may not completely prevent stone formation. At severe condition, chelation therapy is necessary, which utilizing the reaction of D-penicillamine or α-mercaptopropionylglycine with L-cystine to generate more soluble asymmetric disulfides. These drugs have side effects including loss of taste, fever, proteinuria, serum sickness-type reactions, and even frank nephritic syndrome.

Recently, a group of researchers reported an alternative approach to prevent cystinuria based on crystal growth inhibition, which is achieved through the binding of tailored growth inhibitors-L-cystine dimethylester (CDME) and L-cystine methylester (CME) to specific crystal surfaces. CDME almost completely inhibits the crystallization of L-cystine in water with concentrations above 2 mg/L. While in cell culture experiments, CDME causes loss of cell viability at approximately 1 mM, and in rats study, demonstrates adverse effects at dosages of approximately 500 mg/kg per day.

Even though CDME inhibits cystine stone formation in the in vitro study, the methyl esters in CDME are cleavable by the variety of esterases widely present in almost all organs and tissues, most abundantly in our digestive system, blood and liver. In addition, the ester-mediated hydrolysis of cystine esters will produce cystine, which would add to the already elevated levels of cystine in the kidneys and bladder and potentially increase the likelihood of cystine crystal formation and thus making the problem even worse. Therefore, there is a need for new and improved methods for treating cystinuria.

SUMMARY OF THE INVENTION

An aspect of this patent document provides a compound, a pharmaceutically acceptable salt thereof, a solvate thereof, or a prodrug thereof, wherein the compound is represented by Formula I,

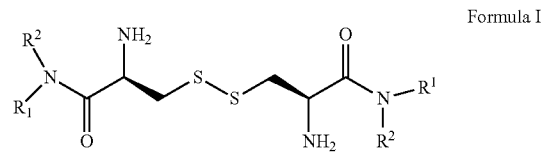

Formula I wherein each pair of $R^1$ and $R^2$ are independently defined as follows:

a) $R^1$ is H, $R^2$ is $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl;

or b) $R^1$ and $R^2$, together with the amide nitrogen link up to form a ring of formula X-1

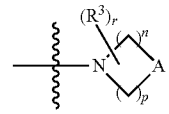

X-1 wherein $R^3$ is $C_{1-8}$alkyl; r is 0, 1, or 2;

n, p, and A are defined as follows:

i)

n and p are independently 2 or 3;

A is $NR^c$, wherein $R^c$ is H, $C_{2-8}$alkyl or a $C_{3-8}$ cycloalkyl;

ii)

n is 0, 1, or 2; p is 2 or 3 or 4;

A is a structure of Formula Y-1

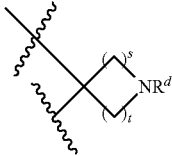

Wherein $R^d$ is H or $C_{1-8}$alkyl;
s is 0, 1, or 2; t is 2, 3 or 4; provided that when n is 0, s is 1 or 2;
or
iii)
n and p are independently 1, 2, 3 or 4;
A is $CH(CH_2)_q NR^e R^f$, wherein
  $R^e$ and $R^f$ are independently $C_{1-8}$alkyl; q is 0-3;
  Alternatively, $R^e$ and $R^f$, together with the N they are attached to, link up to form a 4 to 8-membered heterocyclic ring.

In some embodiments, $R^1$ is H, $R^2$ is $(CH_2)_m NR^a R^b$, m is 2 or 3, and $R^a$ and $R^b$ are each independently a $C_{1-2}$alkyl. In some embodiments, $R^1$ is H, $R^2$ is $(CH_2)_m NR^a R^b$, m is 2 or 3; wherein $R^a$ and $R^b$ link up to form a 5 to 8-membered heterocyclic ring wherein a carbon in the ring is optionally replaced with O.

In some embodiments, $R^1$ and $R^2$, together with the amide nitrogen link up to form the ring of formula X-1, wherein: r is 0; n and p are independently 2 or 4; A is $NR^e$, wherein $R^e$ is hydrogen, $C_{2-8}$alkyl or $C_{3-8}$ cycloalkyl. In some embodiments, n and p are independently 2; $R^e$ is selected from the group consisting of tert-butyl, cyclopropyl, cyclobutyl, and cyclopentyl.

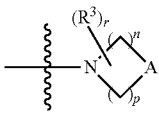
X-1

In some embodiments, $R^1$ and $R^2$, together with the amide nitrogen link up to form a ring of formula X-1, wherein r is 0, A is Formula Y-1. In some embodiments, n is 0, s is 1 or 2. n is 1 or 2, s is 0, 1 or 2.

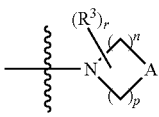
X-1

Y-1

In some embodiments, $R^1$ and $R^2$, together with the amide nitrogen link up to form a ring of formula X-1, wherein r is 0; n and p are independently 1, 2, 3 or 4; A is $CH(CH_2)_q NR^e R^f$, wherein $R^e$ and $R^f$ are independently $C_{1-8}$alkyl; q is 1, 2 or 3.

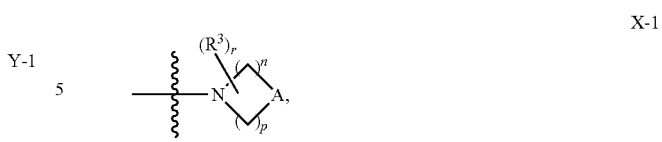
X-1

In some embodiments, $R^1$ and $R^2$, together with the amide nitrogen link up to form a ring of formula X-1, wherein r is 0; A is $CH(CH_2)_q NR^e R^f$, wherein q is 0; $R^e$ and $R^f$, together with the N they are attached to, link up to form a 4 to 8-membered heterocyclic ring.

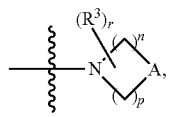
X-1

In some embodiments, the compound is selected from the group consisting of

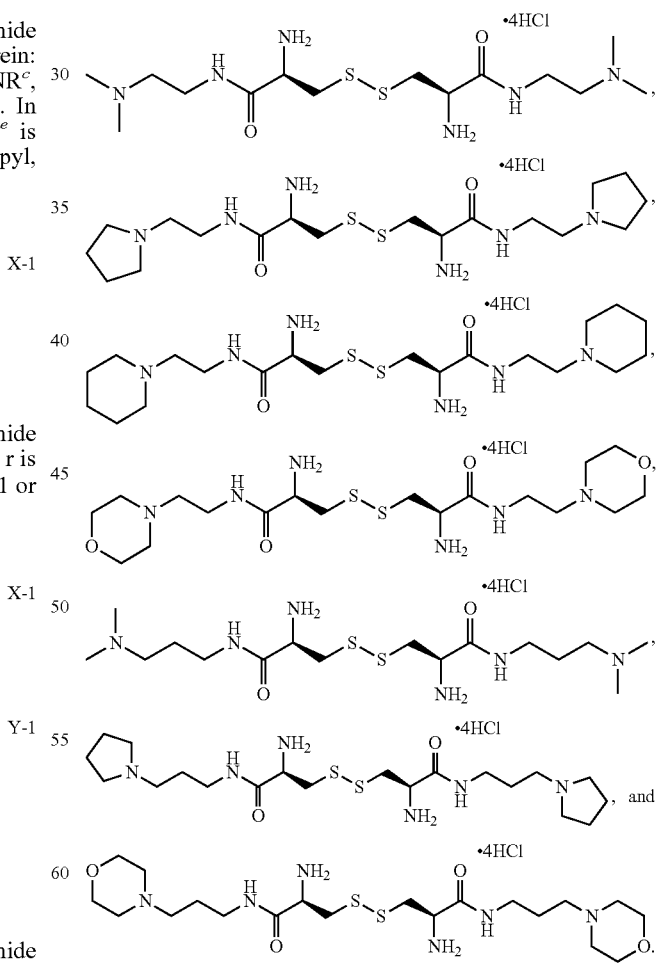

In some embodiments, the compound is selected from the group consisting of:

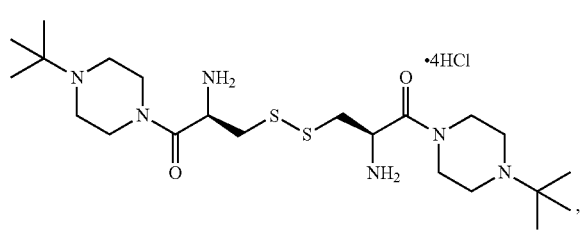

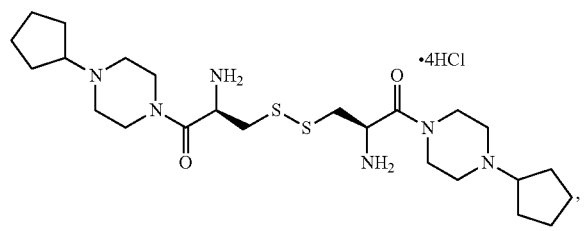

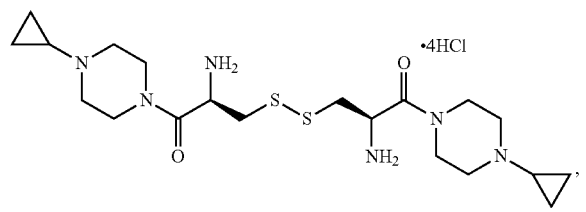

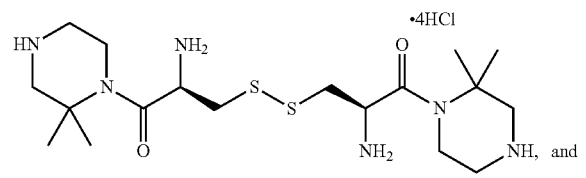

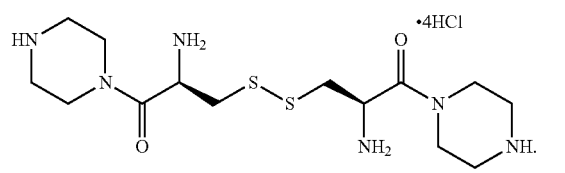

In some embodiments, the compound is selected from the group consisting of

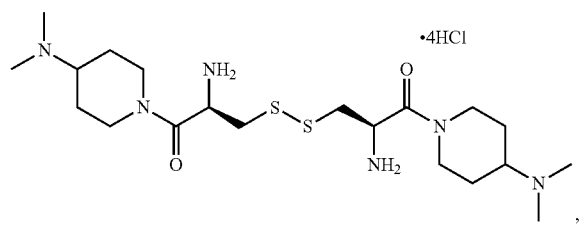

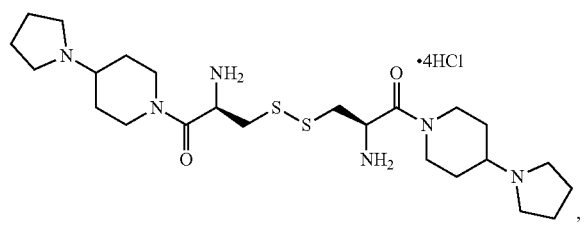

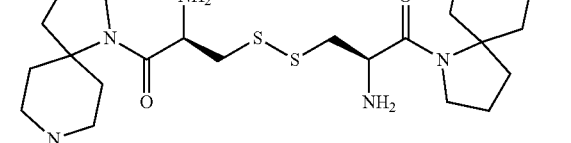

and

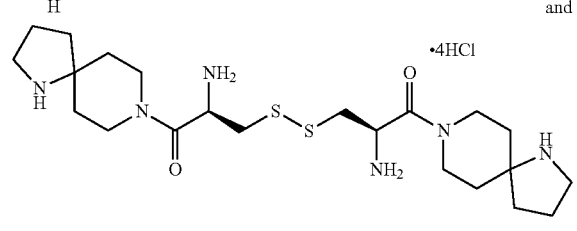

Another aspect discloses a compound, a pharmaceutically acceptable salt thereof, a solvate thereof, or a prodrug thereof, wherein the compound is represented by Formula II,

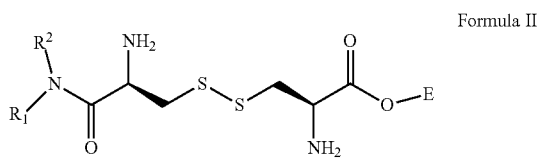

wherein each pair of $R^1$ and $R^2$ are independently defined as follows:

a) $R^1$ and $R^2$ are each independently H or $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl, provided that at least one of $R^1$ and $R^2$ is $(CH_2)_m NR^a R^b$;

or b) $R^1$ and $R^2$, together with the amide nitrogen link up to form a ring of formula P-1

wherein $R^3$ is $C_{1-8}$alkyl; r is 0, 1, or 2;

n, p, and A are defined as follows:

i)

n and p are independently 2 or 3;

A is $NR^e$, wherein $R^e$ is H, $C_{1-8}$alkyl or a $C_{3-8}$ cycloalkyl;

ii)

n is 0, 1, or 2; p is 2 or 3 or 4;

A is a structure of Formula Q-1

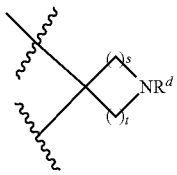

Q-1 wherein $R^d$ is H or $C_{1-8}$alkyl:
s is 0, 1, or 2; t is 2, 3 or 4; provided that when n is 0, s is 1 or 2;
or
iii)
n and p are independently 1, 2, 3 or 4;
A is $CH(CH_2)_qNR^eR^f$, wherein
  $R^e$ and $R^f$ are independently $C_{1-8}$alkyl; q is 0-3;
  alternatively, $R^e$ and $R^f$, together with the N they are attached to, link up to form a 4 to 8-membered heterocyclic ring:
E is H or $C_{1-8}$alkyl.

Another aspect of the disclosure provides a pharmaceutical composition comprising the compound, the pharmaceutically acceptable salt thereof, the solvate thereof, or the prodrug thereof described herein and one or more pharmaceutically acceptable carrier.

Another aspect of the disclosure provides a method of treating a disease associated with a mutation at SLC3A1 gene and/or SLC7A9 gene, comprising administering to a subject in need thereof a pharmaceutically effective amount of a compound disclosed herein, a pharmaceutically acceptable salt thereof, a solvate thereof, or a prodrug thereo. In some embodiments, the disease is cystinuria.

Another aspect of the disclosure provides a method of treating, inhibiting or retarding the growth of L-cystine kidney-stone formation in a subject in need thereof, comprising administering to a subject in need thereof a pharmaceutically effective amount of a compound disclosed herein, a pharmaceutically acceptable salt thereof, a solvate thereof, or a prodrug thereof thereof.

In some embodiments of the treatment methods disclosed herein, there is further included the administration of a secondary agent. Non-limiting examples of the secondary agent include citrate supplementation, acetazolamide, and chelation agent. In some embodiments, the chelation agent is penicillamine or tiopronin.

DETAILED DESCRIPTION

Figure 1:
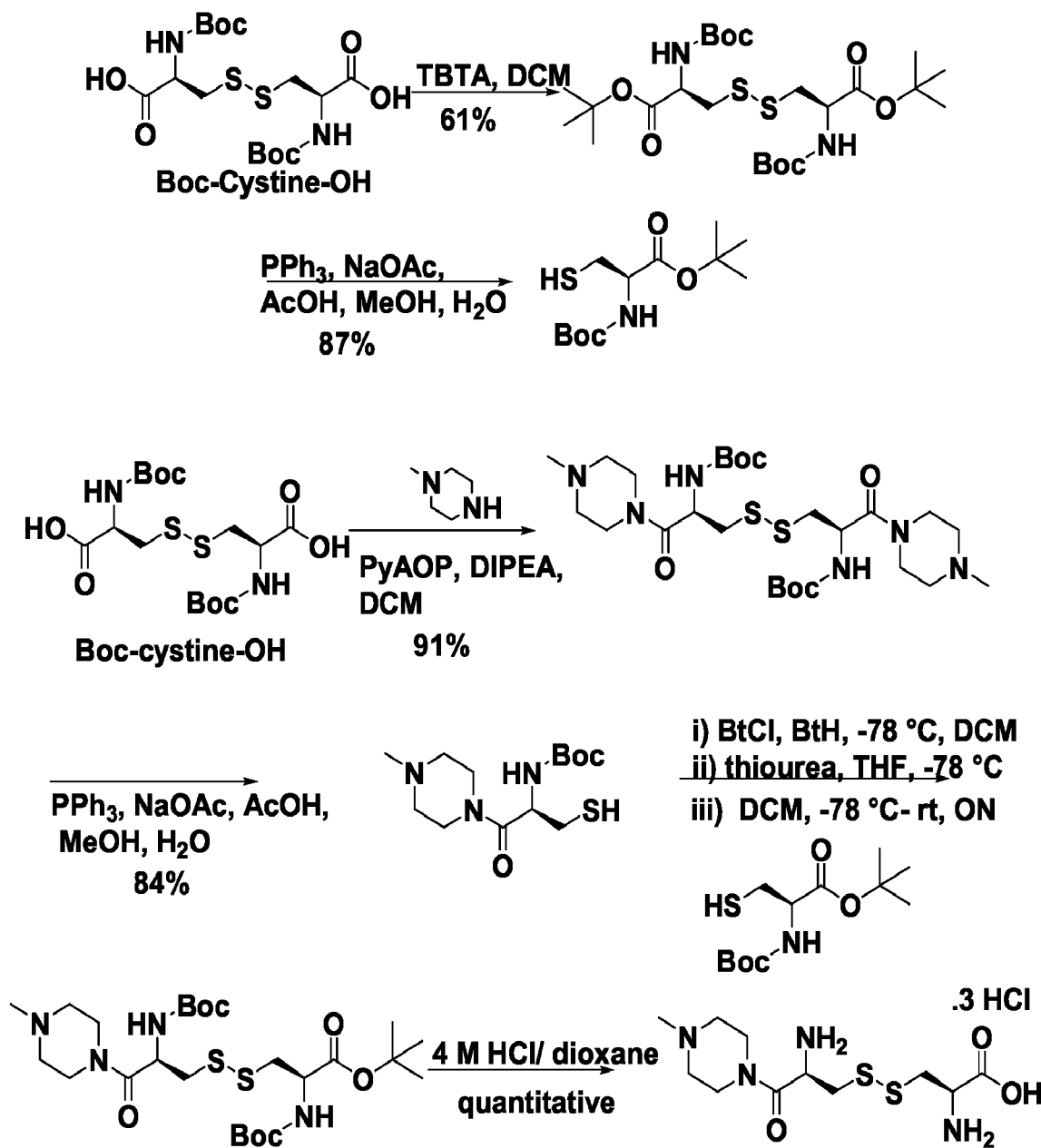
FIG. 1 illustrates synthesis of compound LH1727.
Figure 2:
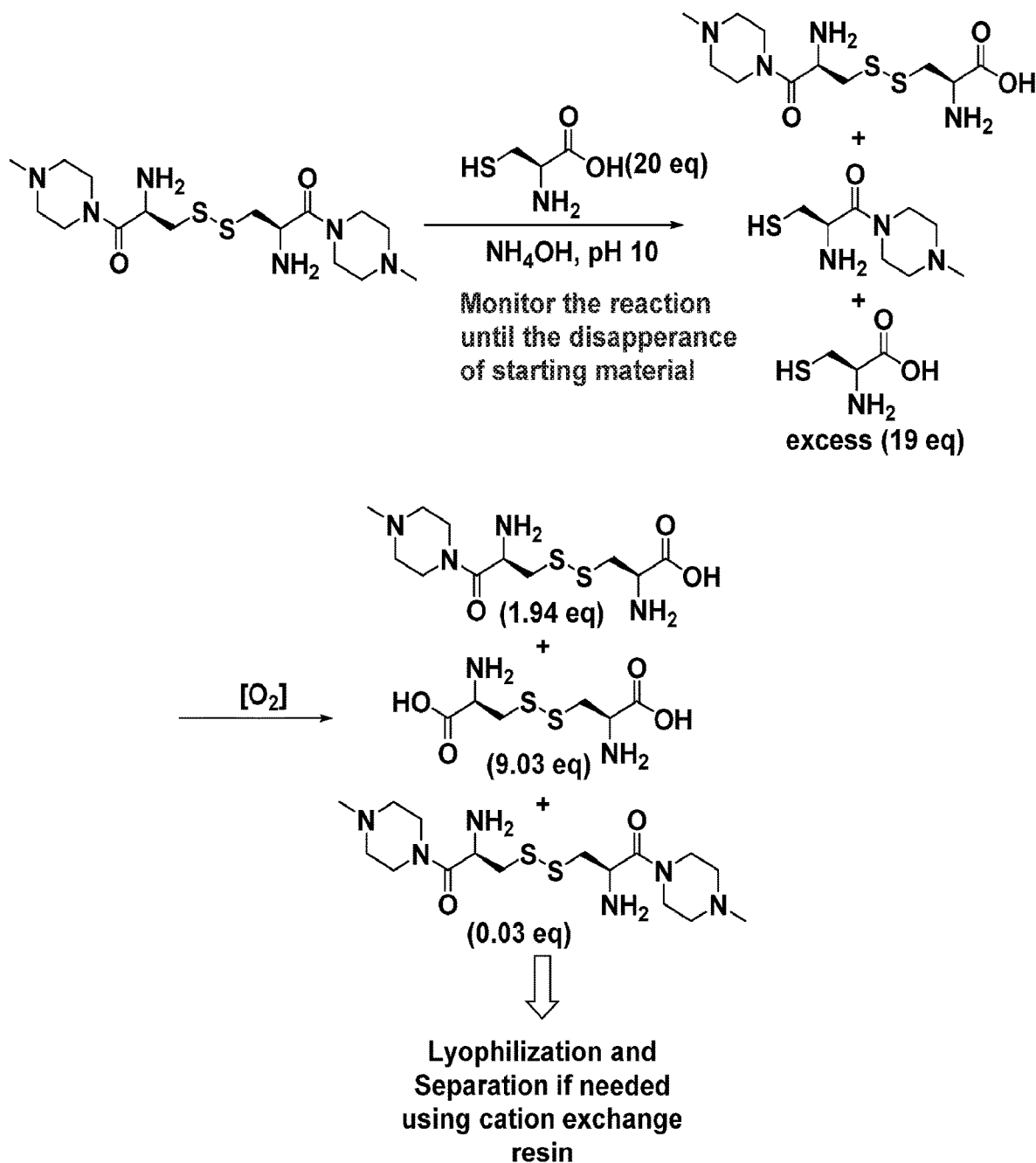
FIG. 2 illustrates the synthesis of compound LH1727 via thiol-sulfide exchange followed by air oxidation.
Figure 3:
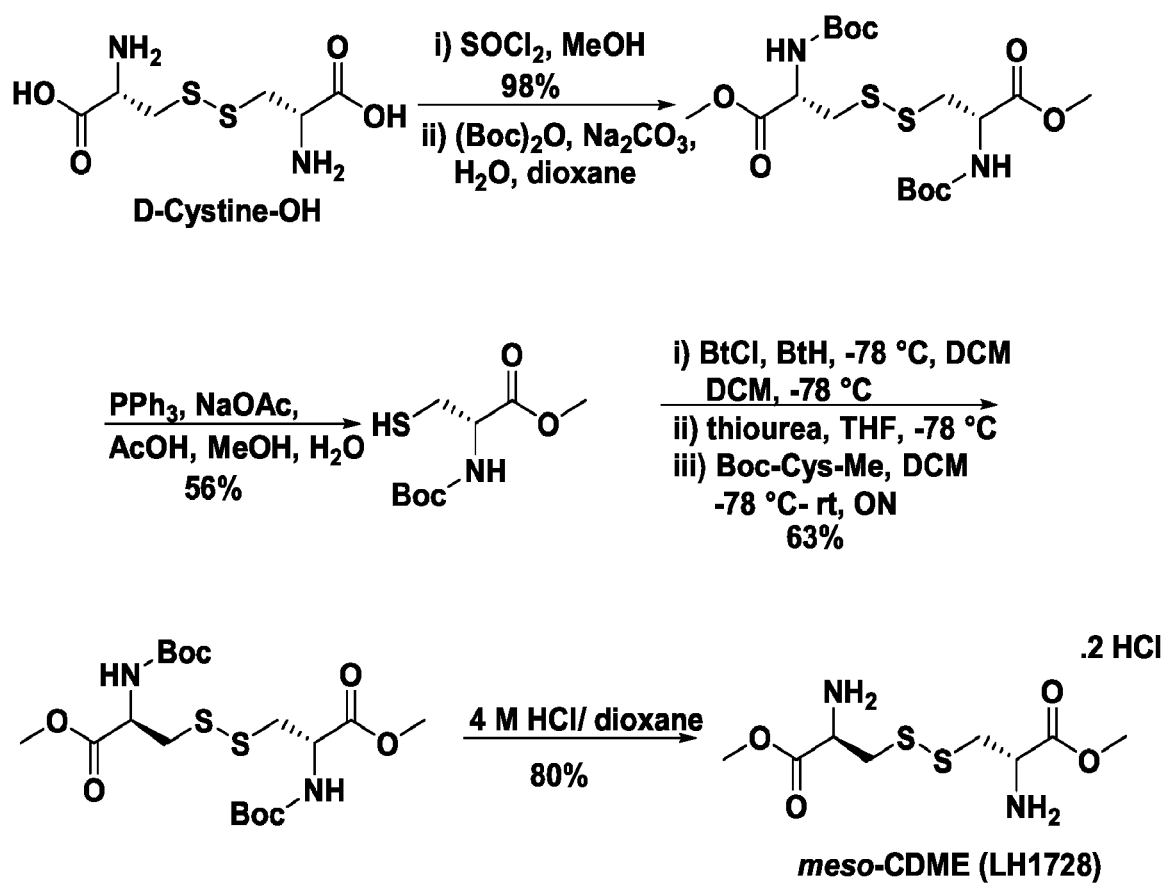
FIG. 3 illustrates the synthesis of meso-CDME (LH1728).
Figure 4:
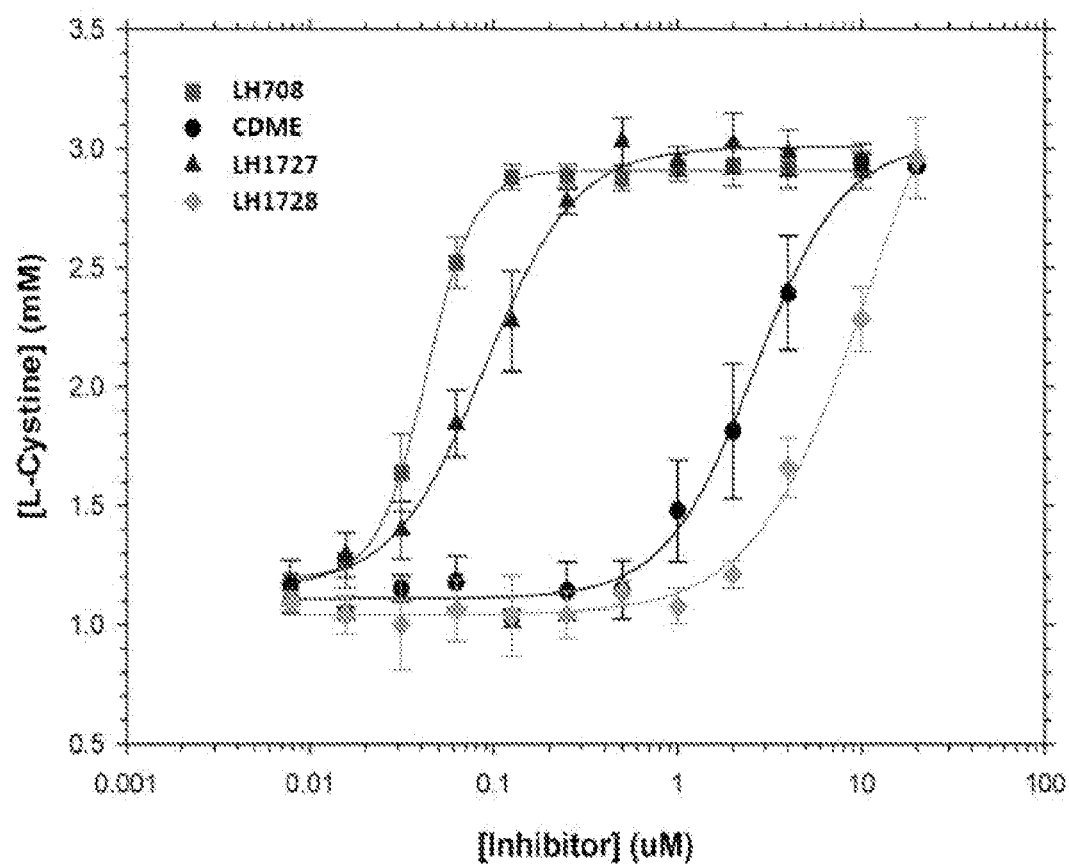
FIG. 4 illustrates the dose response curves of LH708 and LH1727 in comparison to CDME and dl-CDME.
Figure 4:
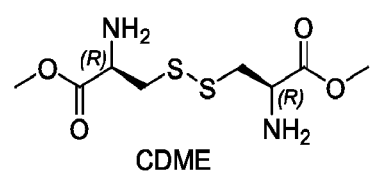
Figure 4:
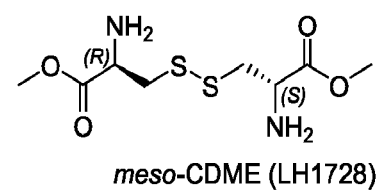

This patent document discloses novel cystine analog compounds for treatment of diseases such as cystinuria. The compounds exhibit enhanced ability to inhibit cystine crystal formations.

While the following text may reference or exemplify specific embodiments of a compound or a method of treating a disease or condition, it is not intended to limit the scope of the compound or method to such particular reference or examples. Various modifications may be made by those skilled in the art, in view of practical and economic considerations, such as the substitutions of the compound and the amount or administration of the compound for treating or preventing a disease or condition.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "pharmaceutical composition" refers to a mixture of a compound disclosed herein with other chemical components, such as diluents or additional carriers. The pharmaceutical composition facilitates administration of the compound to an organism. Multiple techniques of administering a pharmaceutical composition exist in the art including, but not limited to, oral, injection, aerosol, parenteral, and topical administration. In some embodiments, pharmaceutically acceptable salts of the compounds disclosed herein are provided. The pharmaceutically acceptable salt form of the compounds disclosed herein may include, without limitation, an acid-addition salt of an inorganic or organic acid. Examples of the inorganic acid addition salt may include salts formed from hydrochloric acid, hydrobromic acid, sulfuric acid, disulfuric acid, nitric acid, phosphoric acid, perchloric acid, or bromic acid; examples of the organic acid addition salt may include salts of formic acid, acetic acid, propionic acid, oxalic acid, succinic acid, benzoic acid, citric acid, maleic acid, malonic acid, malic acid, tartaric acid, gluconic acid, lactic acid, mandelic acid, glycolic acid, pyruvic acid, glutaric acid, ascorbic acid, palmitic acid, hydroxymaleic acid, hydroxybenzoic acid, phenylacetic acid, cinnamic acid, methanesulfonic acid, benzenesulfonic acid, toluenesulfonic acid, ethanedisulfonic acid, gestisic acid, fumaric acid, lactobionic acid, salicylic acid, phthalic acid, embonic acid, aspartic acid, glutamic acid, camsylic acid, besylic acid, or acetylsalicylic acid.

The term "carrier" refers to a chemical compound that facilitates the incorporation of a compound into cells or tissues.

The term "diluent" refers to chemical compounds diluted in water that will dissolve the composition of interest as well as stabilize the biologically active form of the compound. Salts dissolved in buffered solutions are utilized as diluents in the art. One commonly used buffered solution is phosphate buffered saline because it mimics the salt conditions of human blood. Since buffer salts can control the pH of a solution at low concentrations, a buffered diluent rarely modifies the biological activity of a compound. As used herein, an "excipient" refers to an inert substance that is added to a composition to provide, without limitation, bulk, consistency, stability, binding ability, lubrication, disintegrating ability, etc., to the composition. A "diluent" is a type of excipient.

The term "physiologically acceptable" or "pharmaceutically acceptable" refers to a carrier or diluent that does not abrogate the biological activity and properties of the compound.

The term "therapeutically effective amount" refers to an amount of a compound effective to prevent, alleviate or ameliorate symptoms of disease or prolong the survival of the subject being treated. Determination of a therapeutically effective amount is well within the capability of those skilled in the art without undue experiments.

The term "alkyl" refers to monovalent or divalent saturated alkane radical groups particularly having up to about 18 carbon atoms, more particularly as a lower alkyl, from 1 to 8 carbon atoms and still more particularly, from 1 to 6 carbon atoms. In some embodiments, the divalent saturated alkane radical is also referred as alkylene. The hydrocarbon chain may be either straight-chained or branched. The term "C1-C10 alkyl" or "$C_{1-10}$alkyl" refers to alkyl groups having 1, 2, 3, 4, 5, 6, 7, 8, 9 or 10 carbon atoms. Similarly, the term "C1-C6 alkyl" or "$C_{1-6}$alkyl" refers to alkyl groups having 1, 2, 3, 4, 5, or 6 carbon atoms. Non-limiting examples include groups such as methyl, ethyl, n-propyl, isopropyl, n-butyl, iso-butyl, tert-butyl, n-hexyl, n-octyl, tert-octyl and the like. Non-limiting examples of "$C_{2-8}$alkyl" include ethyl, n-propyl, isopropyl, n-butyl, iso-butyl, tert-butyl, n-pentyl, iso-pentyl, neo-pentyl, n-hexyl, n-octyl, tert-octyl and the like.

The term "cycloalkyl" refers to cyclic hydrocarbyl groups having from 3 to about 10 carbon atoms and having a single cyclic ring or multiple condensed rings, including fused and bridged ring systems, which optionally can be substituted with from 1 to 3 alkyl groups. Such cycloalkyl groups include, by way of example, single ring structures such as cyclopropyl, cyclobutyl, cyclopentyl, cyclooctyl, 1-methylcyclopropyl, 2-methylcyclopentyl, 2-methylcyclooctyl, and the like, and multiple ring structures such as adamantanyl, and the like.

The term "heterocyclyl" or "heterocyclic" group is a ring structure having from about 3 to about 12 atoms, for example 4 to 8 atoms, wherein one or more atoms are selected from the group consisting of N, O, and S, the remainder of the ring atoms being carbon. The heterocyclyl may be a monocyclic, a bicyclic, a spirocyclic or a bridged ring system. Examples of heterocyclic groups for any embodiment disclosed in this patent document include, without limitation, epoxy, azetidinyl, aziridinyl, tetrahydrofuranyl, tetrahydropyranyl, pyrrolidinyl, pyrrolidinonyl, piperidinyl, piperazinyl, imidazolidinyl, thiazolidinyl, dithianyl, trithianyl, dioxolanyl, oxazolidinyl, oxazolidinonyl, decahydroquinolinyl, piperidonyl, 4-piperidinonyl, thiomorpholinyl, thiomorpholinyl 1,1 dioxide, morpholinyl, oxazepanyl, azabicyclohexanes, azabicycloheptanes and oxa azabiocycloheptanes. Examples of 4 to 8 or 5 to 8 membered heterocyclic ring for any embodiment disclosed herein include azetidinyl, pyrrolidinyl, piperidinyl, morpholinyl, azepanyl, and azocanyl.

The term "hetero" when used to describe a compound or a group present on a compound means that one or more carbon atoms in the compound or group have been replaced by a nitrogen, oxygen, or sulfur heteroatom. Hetero may be applied to any of the hydrocarbyl groups described above such as alkyl, e.g. heteroalkyl, cycloheteroalkyl.

The term "halogen" refers to F, Cl, Br, or I.

The term "carboxamide" refers to a group of CONRR, wherein each R is independently a C1-$C_{10}$ alkyl or an aryl.

The term "aromatic ring" or "aryl" refers to a monovalent or bivalent aromatic structure, which includes carbon rings where all ring atoms are carbons. The aromatic structure also includes heteroaromatic or heteroaryl rings where one or more ring atoms are heteroatoms (e.g. oxygen, sulfur, nitrogen) or amino groups. Typical aryl groups having all carbon ring atoms include, but are not limited to, groups derived from aceanthrylene, acephenanthrylene, anthracene, azulene, benzene, fluoranthene, fluorene, hexacene, hexaphene, hexylene, as-indacene, s-indacene, indane, indene, naphthalene, octacene, octaphene, octalene, ovalene, penta-2,4-diene, pentacene, pentalene, pentaphene, perylene, phenalene, phenanthrene, picene, and the like. In some embodiments, an aryl group comprises from 6 to 14 carbon atoms.

Typical heteroaryl groups include, but are not limited to, groups derived from acridine, carbazole, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like.

The term "subject" or "patient" refers to a mammalian and includes humans and animals. Animals including for example sheep, horses, cattle, pigs, dogs, cats, rats, mice, birds, and reptiles.

The term "prodrug" refers to a compound, including derivatives of the compound of this patent document, which have cleavable groups which respectively cleave under physiological conditions and form pharmaceutically active form of the present compounds in vivo. Such examples include, but are not limited to, lower and long alkyl ester derivatives and the like, choline and N-alkymorpholine esters and the like. Prodrugs include acid derivatives well know to practitioners of the art, such as, for example, esters prepared by reaction of the parent acid with a suitable alcohol, or amides prepared by reaction of the parent acid compound with a substituted or unsubstituted amine, or acid anhydrides, or mixed anhydrides. In some cases it is desirable to prepare double ester type prodrugs such as (acyloxy) alkyl esters or ((alkoxycarbonyl)oxy)alkylesters. In some exemplary embodiments, an amino group ($NHC_{1-6}$alkyl or $NH_2$) in a compound may be in the form of $N_{1-6}$alkylX' or NHX' in its prodrug, wherein X' can be alkoxycarbonyl (ROCO) and (acyloxy)alkoxycarbonyl (RCOOCH(R')OCO, R' is H or alkyl, and R is hydrogen, substituted or unsubstituted $C_{1-6}$alkyl, substituted or unsubstituted $C_{6-10}$aryl, substituted or unsubstituted $C_{3-8}$cycloalkyl, substituted or unsubstituted 4-8 membered heterocyclic, and substituted or unsubstituted 5-10 membered heteroaryl.

The term "solvate" refers to forms of the compound that are associated with a solvent. Conventional solvents include water, ethanol, acetic acid and the like. The compounds of the invention may be prepared e.g. in crystalline form and may be solvated or hydrated. Suitable solvates include pharmaceutically acceptable solvates, such as hydrates, and further include both stoichiometric solvates and non-stoichiometric solvates.

The term "treating" or "treatment" of any disease or condition refers, in some embodiments, to ameliorating the disease or disorder (i.e., arresting or reducing the development of the disease or at least one of the clinical symptoms thereof). In some embodiments "treating" or "treatment" refers to ameliorating at least one physical parameter, which may not be discernible by the subject. In some embodiments, "treating" or "treatment" refers to modulating the disease or disorder, either physically, (e.g., stabilization of a discernible symptom), physiologically, (e.g., stabilization of a physical parameter), or both. In some embodiments, "treating" or "treatment" refers to delaying the onset of the disease or disorder, or even preventing the same. "Prophylactic treatment" is to be construed as any mode of treatment that is used to prevent progression of the disease or is used for precautionary purpose for persons at risk of developing the condition.

The compounds disclosed herein may possess one or more asymmetric centers; such compounds can therefore be produced as individual stereoisomers (e.g. R,R; R,S; or S,S for the two stereocenters with NH$_2$ attached shown in Formula A below) or as mixtures thereof.

An aspect of the patent document provides a compound, a pharmaceutically acceptable salt thereof, a solvate thereof, or a prodrug thereof, wherein the compound is represented by Formula A,

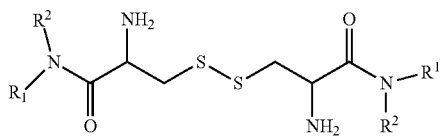

Formula A wherein each pair of R$^1$ and R$^2$ are independently defined as follows:

a) R$^1$ is H, R$^2$ is (CH$_2$)$_m$NR$^a$R$^b$, m is 2, 3 or 4; wherein R$^a$ and R$^b$ are each independently a C$_{1-8}$alkyl, alternatively R$^a$ and R$^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N C$_{1-8}$alkyl; or b) R$^1$ and R$^2$, together with the amide nitrogen link up to form a ring of formula X-1

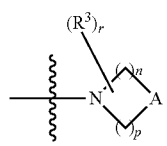

X-1 wherein R$^3$ is C$_{1-8}$alkyl; r is 0, 1, or 2; and
n, p, and A are defined as follows:
  i)
  n and p are independently 2 or 3;
  A is NR$^e$, wherein R$^e$ is H, C$_{2-8}$alkyl or a C$_{3-8}$ cycloalkyl;
  ii)
  n is 0, 1, or 2; p is 2 or 3 or 4;
  A is a structure of Formula X-2

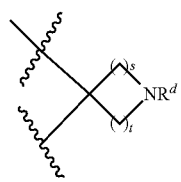

X-2

Wherein R$^d$ is H or C$_{1-8}$alkyl;
s is 0, 1, or 2; t is 2, 3 or 4; provided that when n is 0, s is 1 or 2;
or
  iii)
  n and p are independently 1, 2 or 3;
  A is CH(CH$_2$)$_q$NR$^e$R$^f$, wherein
    R$^e$ and R$^f$ are independently C$_{1-8}$alkyl; q is 0-3;

alternatively, R$^e$ and R$^f$, together with the N they are attached to, link up to form a 4 to 8-membered heterocyclic ring.

Each of the chiral center at the NH2-attached carbon may have R or S configuration. For instance, a compound of formula A may have RR, RS, or SS configurations at the two chiral centers.

When a subsituent appears more than once in a formula, its definition may be same or different regardless of the locations of the multiple appearances. For instance, R$^3$ in each instanace can be the same or different. In some embodiments, R$^1$ is the same in each instance and R$^2$ is the same in each instance.

In some embodiments, Formula A is represented by Formula I

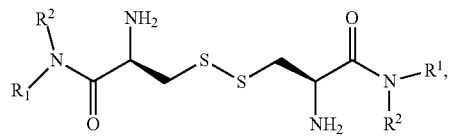

(Formula I)

wherein R$^1$ is H, R$^2$ are as defined above.

In some embodiments of Formula I, R$^1$ is H, R$^2$ is (CH$_2$)$_m$NR$^a$R$^b$, m is 2 or 3; R$^a$ and R$^b$ are each independently a C$_{1-2}$alkyl. In some embodiments, both R$^a$ and R$^b$ are methyl.

In some embodiments of Formula I, R$^1$ is H, R$^2$ is (CH$_2$)$_m$NR$^a$R$^b$, m is 2 or 3; wherein R$^a$ and R$^b$ link up to form a 5 to 8-membered heterocyclic ring wherein a carbon in the ring is optionally replaced with O. Examples of the 5 to 8 membered heterocyclic ring include pyrrolidinyl, piperidinyl, morpholinyl, azepanyl, and azocanyl.

In some embodiments of Formula I, R$^1$ and R$^2$, together with the amide nitrogen link up to form the ring of formula X-1

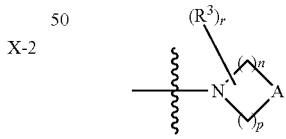

X-1 wherein: r is 0; n and p are independently 2 or 3 or 4; A is NR$^e$, wherein R$^e$ is hydrogen, C$_{2-8}$alkyl or C$_{3-8}$ cycloalkyl. In some embodiments of formula X-1, n and p are each 2, R$^e$ is C$_{2-8}$alkyl or C$_{3-8}$ cycloalkyl. In some embodiments, R$^e$ is tert-butyl, tert-pentyl, cyclopropyl, cyclobutyl, cyclyopentyl or cyclohexyl. In some embodiments, n and p are each 2, R$^e$ is tert-butyl, tert-pentyl, cyclopropyl, cyclobutyl, cyclyopentyl or cyclohexyl.

In some embodiments of Formula I, R$^1$ and R$^2$, together with the amide nitrogen link up to form the ring of formula X-1, wherein r is 0, A is Formula Y-1; n is 0, 1, or 2; p is 2 or 3 or 4; A is a structure of Formula X-2

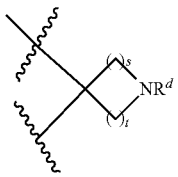

wherein $R^d$ is H or $C_{1-8}$alkyl; s is 0, 1, or 2; t is 2, 3 or 4; provided that when n is 0, s is 1 or 2. In some embodiments, n is 0, s is 1 or 2. In some embodiments, n is 1 or 2, s is 0, 1 or 2, and $R^d$ is H. In some embodiments, n is 1 or 2, s is 0, 1 or 2, and $R^d$ is H. In some embodiments, n is 2, s is 0, 1 or 2, and $R^d$ is H.

In some embodiments of Formula I, $R^1$ and $R^2$, together with the amide nitrogen link up to form a ring of formula X-1, wherein r is 0; n and p are independently 1, 2, 3 or 4, A is $CH(CH_2)_q NR^e R^f$, wherein $R^e$ and $R^f$ are independently $C_{1-8}$alkyl; q is 0-3. In some embodiments, n and p are independently 1 or 2, q is 0. In some embodiments, n and p are independently 1 or 2, q is 0, $R^e$ and $R^f$ are independently $C_{1-3}$alkyl. In some embodiments, n and p are each 2, q is 0, $R^e$ and $R^f$ are independently methyl or ethyl.

In some embodiments of Formula I, $R^1$ and $R^2$, together with the amide nitrogen link up to form a ring of formula X-1, wherein r is 0; n and p are independently 1, 2, 3 or 4, A is $CH(CH_2)_q NR^e R^f$, wherein q is 0, $R^e$ and $R^f$, together with the N they are attached to, link up to form a 4 to 8-membered heterocyclic ring. In some embodiments, n and p are independently 1 or 2, q is 0. In some embodiments, n and p are independently 1 or 2, q is 0, $R^e$ and $R^f$, together with the N they are attached to, link up to form a 4 to 6-membered heterocyclic ring. Examples of the 4 to 6-membered heterocyclic ring include azetidinyl, pyrrolidinyl, piperidinyl, morpholinyl, azepanyl, azocanyl, pyrrolidinyl and piperidinyl.

In some embodiments, the compound of Formula I is selected from the compound is selected from

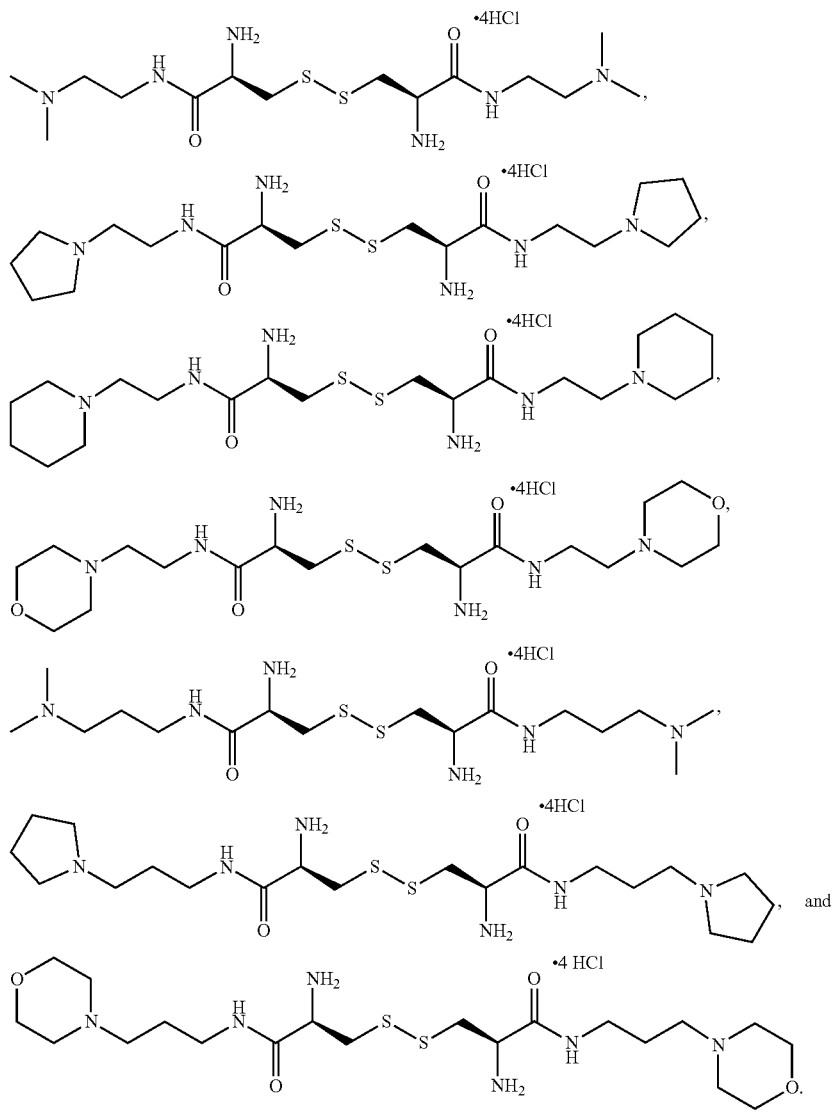

In some embodiments, the compound of Formula I is selected from the compound is selected from

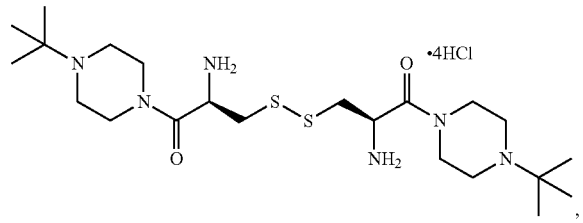

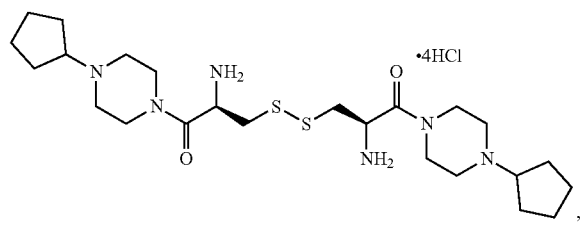

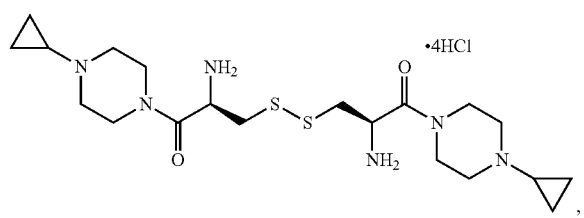

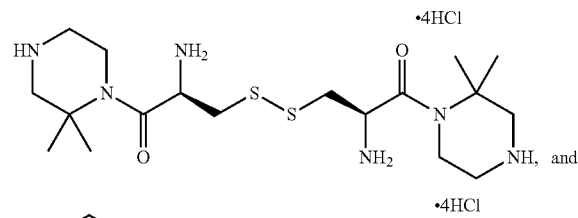

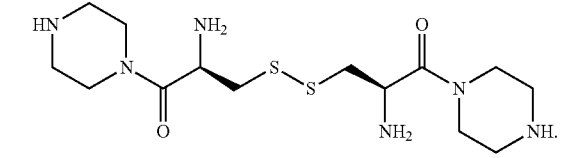

In some embodiments, the compound of Formula I is selected from the compound is selected from

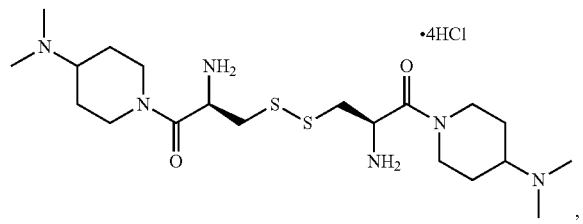

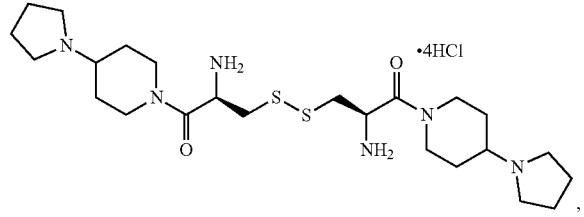

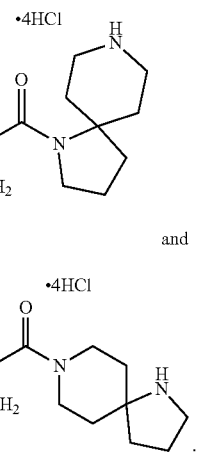

and

In any embodiments disclosed herein, a compound may also be in its salt free form. For instance, a compound can be the salt free form of the above exemplified HCl salt.

The compounds disclosed herein can be prepared via various suitable approaches. Reaction conditions in individual steps in the synthesis can be determined in view of the exemplified embodiments herein and literatures available in the field such as U.S. Pat. No. 9,428,453. The synthesis may also involve selective protection of functional groups for the intermediates. Protective groups for different functional groups are well known in the field as reported in Greene's Protective Groups in Organic Synthesis by Peter Wuts et al., Wiley-Interscience; 4 edition. The entire disclosure of the patent and reference is hereby incorporated by reference.

An exemplary synthesis scheme for compounds of this patent document is shown below:

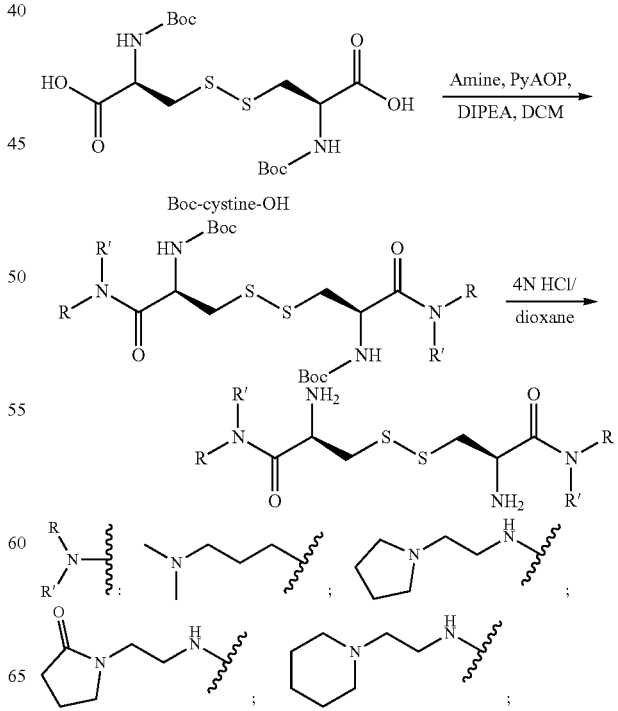

-continued

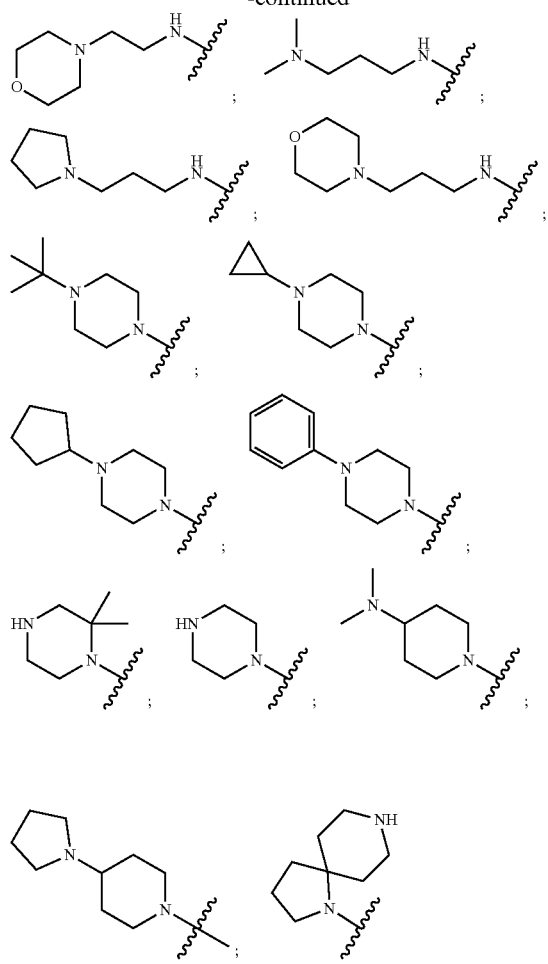

A related aspect provides a compound, a pharmaceutically acceptable salt thereof, a solvate thereof, or a prodrug thereof, wherein the compound is represented by Formula A'.

Formula A'

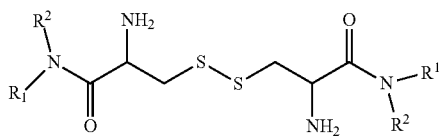

wherein each pair of $R^1$ and $R^2$ are independently defined as follows:
a) $R^1$ is H, $R^2$ is $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl;
or
b) $R^1$ and $R^2$, together with the amide nitrogen link up to form a ring of formula X-1

X-1

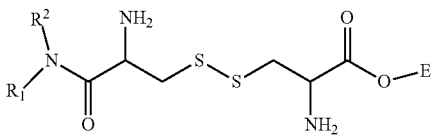

wherein $R^3$ is $C_{1-8}$alkyl; r is 0, 1, or 2; and
n and p are independently 2 or 3:
A is $NR^e$, wherein $R^e$ is $C_{6-10}$aryl (e.g. phenyl or naphthyl) or 5-10 membered heteroaryl. The $C_{6-10}$aryl and 5-10 membered heteroaryl are optionally substituted with one or more substituents selected from $C_{1-8}$alkyl, halogen, CN, $NO_2$, OH, SH, and $OC_{1-6}$alkyl.

The subembodiments of the substituents are as described above for Formula I. Each of the chiral center at the NH2-attached carbon may have R or S configuration. For instance, a compound of formula A' may have RR, RS, or SS configurations at the two chiral centers. In some embodiments, formula A' has RR configurations at the two chiral centers.

Another aspect of the patent document provides a compound, a pharmaceutically acceptable salt thereof, a solvate thereof, or a prodrug thereof, wherein the compound is represented by Formula B, Formula B

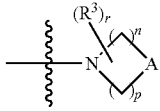

wherein each pair of $R^1$ and $R^2$ are independently defined as follows:
a) $R^1$ and $R^2$ are each independently H or $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl, provided that at least one of $R^1$ and $R^2$ is $(CH_2)_m NR^a R^b$;
or
b) $R^1$ and $R^2$, together with the amide nitrogen link up to form a ring of formula P-1

P-1

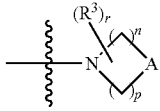

wherein
$R^3$ is $C_{1-8}$alkyl; r is 0, 1, or 2;
n, p, and A are defined as follows:
i)
n and p are independently 2 or 3;
A is $NR^e$, wherein $R^e$ is H, $C_{1-8}$alkyl, $C_{3-8}$ cycloalkyl, $C_{6-10}$aryl, 5-10 membered heteroaryl;

ii)
n is 0, 1, or 2; p is 2 or 3 or 4;
A is a structure of Formula Q-1

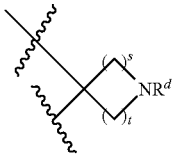

Q-1 wherein $R^d$ is H or $C_{1-8}$alkyl;
s is 0, 1, or 2; t is 2, 3 or 4; provided that when n is 0, s is 1 or 2;
or
iii)
n and p are independently 1, 2, 3 or 4;
A is $CH(CH_2)_qNR^eR^f$, wherein
  $R^e$ and $R^f$ are independently $C_{1-8}$alkyl; q is 0-3;
  alternatively, $R^e$ and $R^f$, together with the N they are attached to, link up to form a 4 to 8-membered heterocyclic ring;
E is H or $C_{1-8}$alkyl.

Each of the chiral center at the NH2-attached carbon in Formula B may have R or S configuration. For instance, a compound of formula B may have RR, RS, or SS configurations at the two chiral centers.

In some embodiments, Formula B is in the form of Formula II.

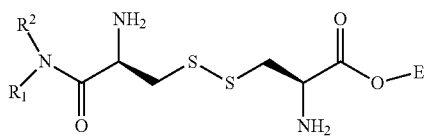

Formula II

In some embodiments, $R^1$ is H, $R^2$ is $(CH_2)_mNR^aR^b$, m is 2 or 3; $R^a$ and $R^b$ are each independently a $C_{1-2}$alkyl. In some embodiments, $R^1$ is H, $R^2$ is $(CH_2)_mNR^aR^b$, m is 2 or 3; wherein $R^a$ and $R^b$ link up to form a 4, 5, 6, 7 or 8-membered heterocyclic ring wherein a carbon in the ring is optionally replaced with O.

In some embodiments, $R^1$ and $R^2$, together with the amide nitrogen link up to form the ring of formula P-1, wherein r is 0, and n and p are independently 2 or 3 or 4; A is $NR^e$, wherein $R^e$ is hydrogen or methyl.

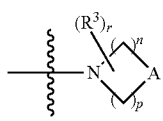

P-1

In some embodiments, $R^1$ and $R^2$, together with the amide nitrogen link up to form the ring of formula P-1, wherein r is 0, and n and p are independently 2 or 3 or 4; A is $NR^e$, wherein $R^e$ is $C_{2-8}$alkyl or $C_{3-8}$ cycloalkyl. In some embodiments, n and p are 2, and $R^e$ is selected from the group consisting of tert-butyl, cyclopropyl, cyclobutyl, and cyclopentyl. In some embodiments, $R^e$ is tert-butyl, or cyclopentyl.

In some embodiments, $R^1$ and $R^2$, together with the amide nitrogen link up to form the ring of formula P-1, wherein r is 0, and n and p are independently 2 or 3 or 4; A is $NR^e$, wherein $R^e$ is $C_{6-10}$aryl (e.g. phenyl or naphthyl) or 5-10 membered heteroaryl. The $C_{6-10}$aryl and 5-10 membered heteroaryl are optionally substituted with one or more substituents selected from $C_{1-8}$alkyl, halogen, CN, $NO_2$, OH, SH, and $OC_{1-6}$alkyl.

In some embodiments, $R^1$ and $R^2$, together with the amide nitrogen link up to form a ring of formula P-1, wherein r is 0, A is Formula Q-1. In some embodiments, n is 0, s is 1 or 2. In some embodiments, n is 1 or 2, s is 0, 1 or 2. In some embodiments, n is 0, p is 3, n is 1 or 2. In some embodiments, n and p are each 2, s is 0, t is 2 or 3.

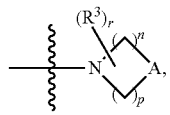

P-1

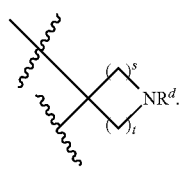

Q-1

In some embodiments, $R^1$ and $R^2$, together with the amide nitrogen link up to form a ring of formula P-1, wherein r is 0; n and p are independently 1, 2, 3 or 4; A is $CH(CH_2)_qNR^eR^f$, wherein $R^e$ and $R^f$ are independently $C_{1-8}$alkyl; q is 0, 1, 2 or 3. In some embodiments, q is 0.

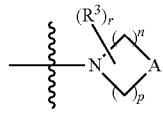

P-1

In some embodiments, $R^1$ and $R^2$, together with the amide nitrogen link up to form a ring of formula P-1, wherein r is 0; A is $CH(CH_2)_qNR^eR^f$, wherein q is 0; $R^e$ and $R^f$, together with the N they are attached to, link up to form a 4 to 8-membered heterocyclic ring. In some embodiments, $R^e$ and $R^f$, together with the N they are attached to form a 4 or 5 membered ring.

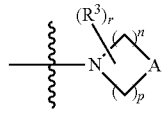

P-1

In some embodiments, E is H. In some embodiments, E is $C_{1-8}$alkyl.

In some embodiments, the compound of Formula II is selected from the following:

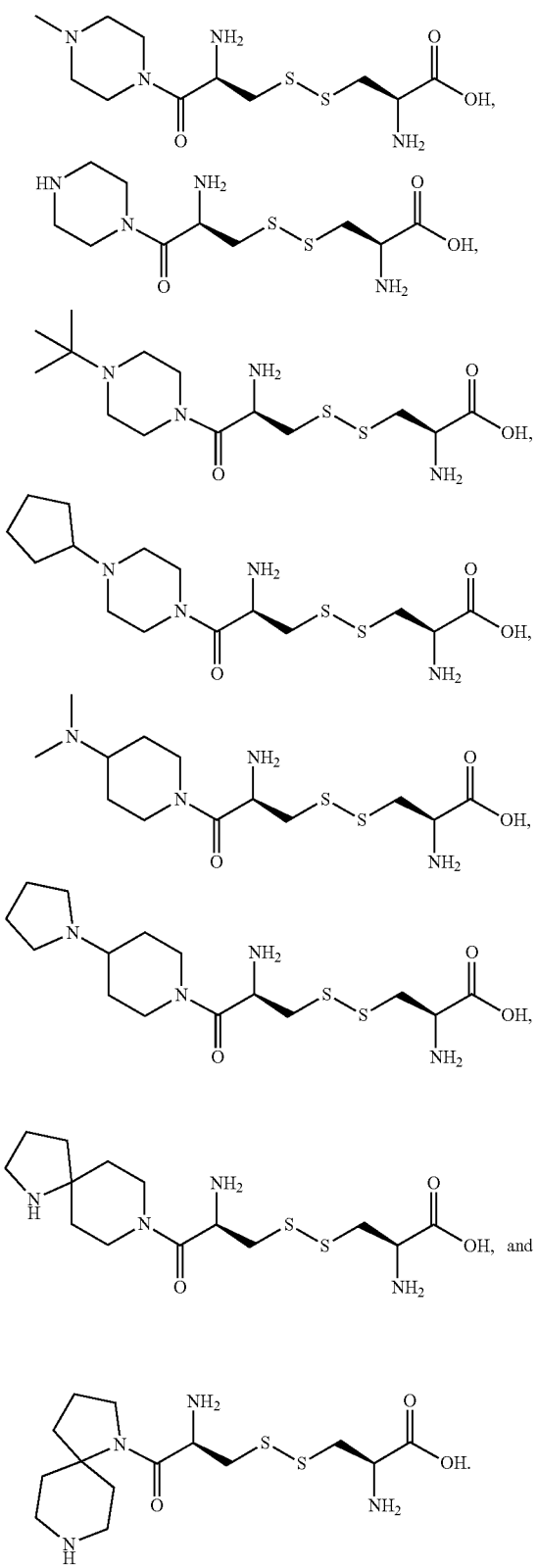

Another aspect provides a prodrug compound, a pharmaceutically acceptable salt thereof, or a solvate thereof, wherein the prodrug compound is represented by Formula C, Wherein:
each pair of $R^1$ and $R^2$ are independently defined as follows:
a) $R^1$ is H or X', $R^2$ is $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl;
or
b) $R^1$ and $R^2$, together with the amide nitrogen link up to form a ring of formula X-1

X-1 wherein
$R^3$ is $C_{1-8}$alkyl; r is 0, 1, or 2;
n, p, and A are defined as follows:
i)
n and p are independently 2 or 3;
A is $NR^e$, wherein $R^e$ is H, $C_{2-8}$alkyl, $C_{3-8}$ cycloalkyl or X';
ii)
n is 0, 1, or 2; p is 2 or 3 or 4;
A is a structure of Formula Y-1

Y-1 wherein $R^d$ is H, $C_{1-8}$alkyl or X';
s is 0, 1, or 2; t is 2, 3 or 4; provided that when n is 0, s is 1 or 2;
or
iii)
n and p are independently 1, 2, 3 or 4;
A is $CH(CH_2)_q NR^e R^f$, wherein
$R^e$ and $R^f$ are independently $C_{1-8}$alkyl, or one of $R^e$ and $R^f$ is $C_{1-8}$alkyl and the other is X'; q is 0-3;
alternatively, $R^e$ and $R^f$, together with the N they are attached to, link up to form a 4 to 8-membered heterocyclic ring;
$R^x$ is H or $C_{1-6}$alkyl;
X' is H, alkoxycarbonyl (R'OCO) or (acyloxy)alkoxycarbonyl (R'COOCH(R'')OCO, wherein R' is H or C$_{1-6}$alkyl, R" is H or C$_{1-6}$alkyl, provided that at least one of the X' is not hydrogen.

The prodrug compound of Formula III can be derived from the compounds of Formula I or any exemplified compounds under Formula A. The compound may contain chiral centers with RR, RS, or SS configuration. In some embodiments, Formula C is has stereochemistry as in Formula III. All groups of Formula III are as defined in Formula C including R$^x$, X', items (a) and (b).

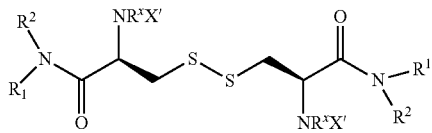

Formula III

When a subsituent appears more than once in a formula, its definition may be same or different regardless of the locations of the multiple appearances. For instance, X' and R' in each instanace can be the same or different. In some embodiments, R$^1$ is the same in each instance and R$^2$ is the same in each instance.

In some embodiments of Formula III, none of R$^1$, R$^2$, or their sub-embodiments contain X', and X' is present only in one or both of the amino groups α to the carbonyl moieties.

In some embodiments, the compound is defined as Formula III-a.

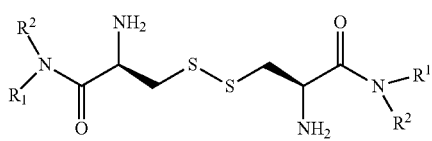

III-a

In some embodiments of Formula III-a, R$^1$ is X', which is alkoxycarbonyl (R'OCO) or (acyloxy)alkoxycarbonyl (R'COOCH(R")OCO, R$^2$ is (CH$_2$)$_m$NR$^a$R$^b$, m is 2 or 3; R$^a$ and R$^b$ are each independently a C$_{1-2}$alkyl. In some embodiments of Formula III-a, R$^1$ is (R'OCO) or (acyloxy)alkoxycarbonyl (R'COOCH(R")OCO, R$^2$ is (CH$_2$)$_m$NR$^a$R$^b$, mis 2 or 3; wherein R$^a$ and R$^b$ link up to form a 5 to 8-membered heterocyclic ring wherein a carbon in the ring is optionally replaced with O.

In some embodiments of Formula III-a, R$^1$ and R$^2$, together with the amide nitrogen link up to form the ring of formula X-1

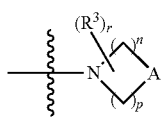

X-1 wherein r is 0, and n and p are independently 2 or 3 or 4;

A is NX', wherein X' is alkoxycarbonyl (R'OCO) or (acyloxy)alkoxycarbonyl (R'COOCH(R")OCO. In some embodiments, n and p are independently 2, and R$^e$ is selected from the group consisting of tert-butyl, cyclopropyl, cyclobutyl, and cyclopentyl.

In some embodiments of Formula III-a, R$^1$ and R$^2$, together with the amide nitrogen link up to form a ring of formula X-1

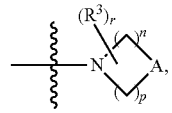

X-1 wherein r is 0, A is Formula Y-1

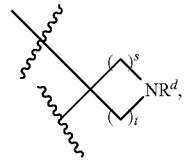

Y-1

R$^d$ is X', wherein X' is alkoxycarbonyl (R'OCO) or (acyloxy)alkoxycarbonyl (R'COOCH(R")OCO. In some embodiments, n is 0, s is 1 or 2. In some embodiments, n is 1 or 2, s is 0, 1 or 2.

In some embodiments of Formula III-a, R$^1$ and R$^2$, together with the amide nitrogen link up to form a ring of formula X-1

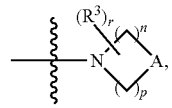

X-1 r is 0; n and p are independently 1, 2, 3 or 4;

A is CH(CH$_2$)$_q$NR$^e$R$^f$, wherein one of R$^e$ and R$^f$ is C$_{1-8}$alkyl and the other is X' as alkoxycarbonyl (R'OCO) or (acyloxy)alkoxycarbonyl (R'COOCH(R")OCO; q is 0-3.

Another aspect of the present disclosure provides a pharmaceutical composition containing a therapeutically effective amount of the above described compound, a pharmaceutically acceptable salt thereof, a solvate thereof, or a prodrug thereof and a pharmaceutically acceptable carrier. The pharmaceutical composition may also contain one or more physiologically acceptable surface active agents, additional carriers, diluents, excipients, smoothing agents, suspension agents, film forming substances, and coating assistants, or a combination thereof; and a composition disclosed herein. Acceptable additional carriers or diluents for therapeutic use are well known in the pharmaceutical art, and are described, for example, in Remington's Pharmaceutical Sciences, 18th Ed., Mack Publishing Co., Easton, PA (1990), which is incorporated herein by reference in its entirety. Preservatives, stabilizers, dyes, sweeteners, fragrances, flavoring agents, and the like may be provided in the pharmaceutical composition. For example, sodium benzoate, ascorbic acid and esters of p-hydroxy benzoic acid may be added as preservatives. In addition, antioxidants and suspending agents may be used. In various embodiments, alcohols, esters, sulfated aliphatic alcohols, and the like may be used as surface active agents; sucrose, glucose, lactose, starch, microcrystalline cellulose, crystallized cellulose, mannitol, light anhydrous silicate, magnesium aluminate, magnesium metasilicate aluminate, synthetic aluminum silicate, calcium carbonate, sodium acid carbonate, calcium hydrogen phosphate, calcium carboxymethyl cellulose, and the like may be used as excipients; magnesium stearate, talc, hardened oil and the like may be used as smoothing agents; coconut oil, olive oil, sesame oil, peanut oil, soya may be used as suspension agents or lubricants; cellulose acetate phthalate as a derivative of a carbohydrate such as cellulose or sugar, or methylacetate-methacrylate copolymer as a derivative of polyvinyl may be used as suspension agents; and plasticizers such as ester phthalates and the like may be used as suspension agents.

The pharmaceutical compounds described herein can be administered to a human patient per se, or in pharmaceutical compositions where they are mixed with other active ingredient(s), as in combination therapy, or suitable carriers or excipient(s). In some embodiments, a dosage form includes those forms in which the compound is administered per se. In addition, a dosage form may include a pharmaceutical composition. In any case, the dosage form may comprise a sufficient amount of the compound to treat a disease as part of a particular administration protocol, as would be understood by those of skill in the art. Techniques for formulation and administration of the compounds of the instant application may be found in "Remington's Pharmaceutical Sciences," Mack Publishing Co., Easton, PA, 18th edition, 1990.

Suitable routes of administration may, for example, include oral, rectal, transmucosal, topical, or intestinal administration; parenteral delivery, including intramuscular, subcutaneous, intravenous, intramedullary injections, as well as intrathecal, direct intraventricular, intraperitoneal, intranasal, or intraocular injections. The compound can also be administered in sustained or controlled release dosage forms, including depot injections, osmotic pumps, pills, transdermal (including electrotransport) patches, and the like, for prolonged and/or timed, pulsed administration at a predetermined rate.

The pharmaceutical compositions may be manufactured in a manner that is itself known, e.g., by means of conventional mixing, dissolving, granulating, dragee-making, levigating, emulsifying, encapsulating, entrapping or tabletting processes.

Pharmaceutical compositions may be formulated in any conventional manner using one or more physiologically acceptable carriers comprising excipients and auxiliaries which facilitate processing of the active compounds into preparations which can be used pharmaceutically. Proper formulation is dependent upon the route of administration chosen. Any of the well-known techniques, diluents, carriers, and excipients may be used as suitable and as understood in the art; e.g., in Remington's Pharmaceutical Sciences, above.

Injectables can be prepared in conventional forms, either as liquid solutions or suspensions, solid forms suitable for solution or suspension in liquid prior to injection, or as emulsions. Suitable excipients are, for example, water, saline, dextrose, mannitol, lactose, lecithin, albumin, sodium glutamate, cysteine hydrochloride, and the like. In addition, if desired, the injectable pharmaceutical compositions may contain minor amounts of nontoxic auxiliary substances, such as wetting agents, pH buffering agents, and the like. Physiologically compatible buffers include, but are not limited to, Hanks's solution, Ringer's solution, or physiological saline buffer. If desired, absorption enhancing preparations may be utilized.

For transmucosal administration, penetrants appropriate to the barrier to be permeated may be used in the formulation.

Pharmaceutical formulations for parenteral administration, e.g., by bolus injection or continuous infusion, include aqueous solutions of the active compounds in water-soluble form. Additionally, suspensions of the active compounds may be prepared as appropriate oily injection suspensions. Aqueous injection suspensions may contain substances which increase the viscosity of the suspension, such as sodium carboxymethyl cellulose, sorbitol, or dextran. Optionally, the suspension may also contain suitable stabilizers or agents that increase the solubility of the compounds to allow for the preparation of highly concentrated solutions. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents. Alternatively, the active ingredient may be in powder form for constitution with a suitable vehicle, e.g., sterile pyrogen-free water, before use.

For oral administration, the composition can be formulated readily by combining the compositions of interest with pharmaceutically acceptable carriers well known in the art. Such carriers, which may be used in addition to the cationic polymeric carrier, enable the compositions to be formulated as tablets, pills, dragees, capsules, liquids, gels, syrups, slurries, suspensions and the like, for oral ingestion by a patient to be treated. Pharmaceutical preparations for oral use can be obtained by combining the active compound with solid excipient, optionally grinding a resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethyl-cellulose, and/or polyvinylpyrrolidone (PVP), e.g., Povidone. If desired, disintegrating agents may be added, such as the cross-linked polyvinylpyrrolidone (e.g. Crospovidone), agar, or alginic acid or a salt thereof such as sodium alginate. Dragee cores are provided with suitable coatings. For this purpose, concentrated sugar solutions may be used, which may optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments may be added to the tablets or dragee coatings for identification or to characterize different combinations of active compound doses.

Pharmaceutical preparations which can be used orally include push-fit capsules made of gelatin, as well as soft, sealed capsules made of gelatin and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols. In addition, stabilizers may be added. All formulations for oral administration should be in dosages suitable for such administration.

For buccal administration, the compositions may take the form of tablets or lozenges formulated in a conventional manner. Administration to the buccal mucosa and sublingually are contemplated.

For administration by inhalation, the composition can be conveniently delivered in the form of an aerosol spray presentation from pressurized packs or a nebulizer, with the use of a suitable propellant, e.g., dichlorodifluoromethane, trichlorofluoromethane, dichlorotetrafluoroethane, carbon dioxide or other suitable gas. In the case of a pressurized aerosol the dosage unit may be determined by providing a valve to deliver a metered amount. Capsules and cartridges of, e.g., gelatin for use in an inhaler or insufflator may be formulated containing a powder mix of the compound and a suitable powder base such as lactose or starch.

The compositions may also be formulated in rectal compositions such as suppositories or retention enemas, e.g., containing conventional suppository bases such as cocoa butter or other glycerides.

A related aspect provides a kit, which includes a compound disclosed herein or a pharmaceutically acceptable salt thereof, or a pharmaceutical composition thereof and an instruction for treating or preventing diseases associated with a mutation at SLC3A1 gene and/or SLC7A9 gene in a subject. In some embodiments, the kit further includes an additional agent for treating such diseases. Nonlimiting examples of the secondary agent include citrate supplementation, acetazolamide, and chelation agent.

Another aspect of this disclosure provides a method of treating a disease associated with a mutation at SLC3A1 gene and/or SLC7A9 gene in a subject comprising administering to the subject in need a therapeutically effective amount of a compound of Formula I, a pharmaceutically acceptable salt thereof, a solvate thereof, or a prodrug thereof or a pharmaceutical composition thereof. Specific embodiments of the compound of Formula I, its salt or pharmaceutical composition are as described above.

In some embodiments, the disease is cystinuria. By lowering the concentration of L-cystine in urine and/or increasing L-cystine solubility in urine, the compounds disclosed herein effectively inhibit cystine stone formation.

Another aspect of the patent document provides a method of treating, inhibiting or retarding the growth of L-cystine kidney-stone formation in a subject in need thereof, comprising administering to a subject in need thereof a pharmaceutically effective amount of a compound of Formula I, a pharmaceutically salt thereof, or a pharmaceutical composition thereof.

The methods disclosed herein can be applied to humans and animals. In some embodiments, the subject or patient is a human. In some embodiments, the subject or patient is an animal including for example sheep, horses, cattle, pigs, dogs, cats, rats, mice, birds, and reptiles. In some embodiments, the subject or patient is a domesticated animal.

In any of the methods disclosed herein, the compounds can also be used in combination with other agents used for treatment of cystinuria or other agents which will enhance such treatment regime for subjects in need of such treatment. The individual components of such combinations can be administered separately at different times during the course of therapy or concurrently in divided or single combination forms to patients or regions of such patients in need of such therapy. The instant invention is therefore to be understood as embracing all such regimes of simultaneous or alternating treatment and the term "administering" is to be interpreted accordingly. It will be understood that the scope of combinations of the compounds of this invention with other agents useful to treat the targeted condition includes in principle any combination with any pharmaceutical composition useful for treating disorders related to kidney stone or related chronic kidney disease. In some embodiments, the secondary agent is selected from citrate supplementation, acetazolamide, and chelation agent.

It should be noted that the attending physician would know how to and when to terminate, interrupt, or adjust administration due to toxicity or organ dysfunctions. Conversely, the attending physician would also know to adjust treatment to higher levels if the clinical response were not adequate (precluding toxicity). The magnitude of an administrated dose in the management of the disorder of interest will vary with the severity of the condition to be treated and to the route of administration. The severity of the condition may, for example, be evaluated, in part, by standard prognostic evaluation methods. Further, the dose and perhaps dose frequency will also vary according to the age, body weight, and response of the individual patient. A program comparable to that discussed above may be used in veterinary medicine.

Although the exact dosage will be determined on a drug-by-drug basis, in most cases, some generalizations regarding the dosage can be made. The daily dosage regimen for an adult human patient may be, for example, an oral dose of about 0.1 mg to 2000 mg of the active ingredient, preferably about 1 mg to about 500 mg. e.g. 5 to 200 mg. In other embodiments, an intravenous, subcutaneous, or intramuscular dose of the active ingredient of about 0.01 mg to about 100 mg. preferably about 0.1 mg to about 60 mg, e.g. about 1 to about 40 mg is used. In cases of administration of a pharmaceutically acceptable salt, dosages may be calculated as the free acid. In some embodiments, the composition is administered 1 to 4 times per day. Alternatively, the compositions may be administered by continuous intravenous infusion, preferably at a dose of up to about 1000 mg per day. As will be understood by those of skill in the art, in certain situations it may be necessary to administer the compounds disclosed herein in amounts that exceed, or even far exceed, the above-stated, preferred dosage range in order to effectively and aggressively treat particularly aggressive diseases or conditions. In some embodiments, the compounds will be administered for a period of continuous therapy, for example for a week or more, or for months or years.

The amount of composition administered may be dependent on the subject being treated, on the subject's weight, the severity of the condition, the manner of administration and the judgment of the prescribing physician.

The compositions may, if desired, be presented in a pack or dispenser device which may contain one or more unit dosage forms containing the active ingredient. The pack may for example comprise metal or plastic foil, such as a blister pack. The pack or dispenser device may be accompanied by instructions for administration. The pack or dispenser may also be accompanied with a notice associated with the container in form prescribed by a governmental agency regulating the manufacture, use, or sale of pharmaceuticals, which notice is reflective of approval by the agency of the form of the drug for human or veterinary administration. Such notice, for example, may be the labeling approved by the U.S. Food and Drug Administration for prescription drugs, or the approved product insert. Compositions comprising a compound formulated in a compatible pharmaceutical carrier may also be prepared, placed in an appropriate container, and labeled for treatment of an indicated condition.

EXAMPLE

Synthesis

Example 1 L-Cystine bispiperazide tetrahydrochloride (LH1726)

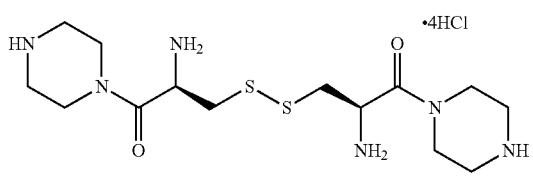 [SMILES: N[C@@H](CSSC[C@H](N)C(=O)N1CCNCC1)C(=O)N1CCNCC1]

Boc-L-cystine-OH (70 mg, 0.16 mmol) was suspended in 2 mL of dry DCM. DIEA (168 uL, 0.96 mmol) was added and gave a clear solution. Then tert-butyl piperazine-1-carboxylate (90 mg, 0.48 mmol) and PyAOP (174 mg, 0.33 mmol) were added to the solution and the reaction mixture was left to stir at room temperature for 30 min. The mixture was diluted with (20 mL) of water and extracted with (3×40 mL) of DCM. The combined organic layers were washed with (15 mL) of brine and dried over $Na_2SO_4$. The solvent was evaporated under reduced pressure and the yellow residue was purified via ISCO (5% MeOH: DCM+0.1% TEA/DCM) and the product was eluted at 42%. The solvent was evaporated under reduced pressure to give a light yellow solid (74 mg, 60% yield). $^1$H NMR (400 MHz, $CDCl_3$) δ 1.43 (s, 18H), 1.47 (s, 18H), 3.01 (b, 4H), 3.40-3.67 (m, 16H), 4.93 (t, 2H, J=8 Hz), 5.44 (d, 2H, J=8 Hz). $^{13}$C NMR (100 MHz, $CDCl_3$) δ 169.16, 154.99, 154.44, 80.39, 49.13, 45.75, 42.23, 41.52, 28.33. LC-MS (ESI$^+$) m/z 777.1 [M+H]$^+$.

The above compound (12 mg, 0.015 mmol) was dissolved in 60 uL of MeOH and cooled to 0° C. 4 M HCl/dioxane (70 uL, 0.28 mmol) in four portions was added to the chilled solution every half an hour and the solution was warmed to room temperature after each addition. There was still some mono-deprotected product so additional 4 M HCl/dioxane (70 uL, 0.28 mmol) was added in two portions to the solution at 0° C. and the solution was warmed to room temperature and left to stir for 1 h. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give a yellowish white solid (6 mg, 85% yield). 1H NMR (400 MHz, D2O) δ 3.34-3.44 (m, 12H), 3.71-3.77 (m, 2H), 3.94-4.10 (m, 8H). 13C NMR (100 MHz, D2O) δ 166.60, 49.70, 42.71, 39.36, 37.88. LC-MS (ESI+) m/z 377.2 [M+H]+. HRMS (ESI+) m/z calculated for C14H29N6O2S2+ [M+H]+377.1788, found 377.1799.

Example 2 L-Cystine bis(N'-tert-butylpiperazide) tetrahydrochloride (LH1729)

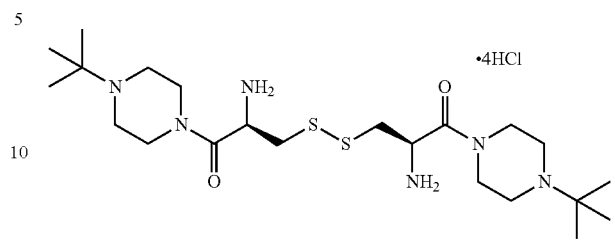

Boc-L-cystine-OH (70 mg, 0.16 mmol) was suspended in 2 mL of dry DCM. DIEA (168 uL, 0.96 mmol) was added and gave a clear solution. Then 1-tert-butyl piperazine (77 uL, 0.48 mmol) and PyAOP (174 mg, 0.33 mmol) were added to the solution and the reaction mixture was left to stir at room temperature for 30 min. The mixture was diluted with (20 mL) of water and extracted with (3×40 mL) of DCM. The combined organic layers were washed with (15 mL) of brine and dried over $Na_2SO_4$. The solvent was evaporated under reduced pressure and the residue was purified via ISCO (20% MeOH: DCM+0.1% TEA/DCM) and the product was eluted at 25%. The solvent was evaporated under reduced pressure to give a light yellow solid (80 mg, 73% yield). $^1$H NMR (400 MHZ, $CDCl_3$) δ 1.06 (s, 18H), 1.42 (s, 18H), 2.56 (b, 8H), 2.94-3.02 (m, 4H), 3.64 (b, 8H), 4.93 (b, 2H), 5.46 (d, 2H, J=8 Hz). $^{13}$C NMR (100 MHZ, $CDCl_3$) δ 168.62, 155.04, 80.03, 49.05, 46.35, 45.51, 42.89, 41.84, 28.35, 25.84. LC-MS (ESI$^+$) m/z 689.22 [M+H]$^+$.

The above compound (27 mg, 0.04 mmol) was dissolved in 120 uL of MeOH and cooled to 0° C. 4 M HCl/dioxane (116 uL, 0.46 mmol) in four portions was added to the chilled solution every half an hour and the solution was warmed to room temperature after each addition. There was still some mono-deprotected product so additional 4 M HCl/dioxane (58 uL, 0.23 mmol) was added to the solution at 0° C. and the solution was warmed to room temperature and left to stir for 1 h. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give a yellowish white solid (21 mg, 84% yield). $^1$H NMR (400 MHZ, $D_2O$) δ 1.46 (s, 18H), 3.21-3.44 (m, 12H), 3.76 (b, 8H), 4.29 (b, 2H). $^{13}$C NMR (100 MHz, $D_2O$) δ 166.33, 64.82, 49.74, 45.66, 42.94, 39.88, 37.55, 23.62. LC-MS (ESI$^+$) m/z 489.23 [M+H]$^+$. HRMS (ESI$^+$) m/z calculated for $C_{22}H_{45}N_6O_2S_2^+$ [M+H]$^+$489.3040, found 489.3075.

Example 3 L-Cystine bis(N'-cyclopropylpiperazide) tetrahydrochloride

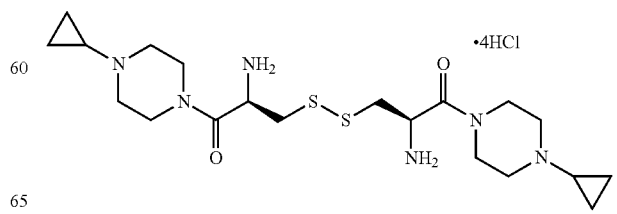

Boc-L-cystine-OH (70 mg, 0.16 mmol) was suspended in 2 mL of dry DCM. DIEA (168 uL, 0.96 mmol) was added and gave a clear solution. Then 1-cyclopropyl piperazine (58 uL, 0.48 mmol) and PyAOP (174 mg, 0.33 mmol) were added to the solution and the reaction mixture was left to stir at room temperature for 30 min. The mixture was diluted with (20 mL) of water and extracted with (3×40 mL) of DCM. The combined organic layers were washed with (15 mL) of brine and dried over Na$_2$SO$_4$. The solvent was evaporated under reduced pressure and the dark yellow residue was purified via ISCO (5% MeOH: DCM+0.1% TEA/DCM) and the product was eluted at 25%. The solvent was evaporated under reduced pressure to give a yellow solid (70 mg, 67%). $^1$H NMR (400 MHZ, CDCl$_3$) δ 0.40-0.46 (m, 8H), 1.41 (s, 18H), 1.60 (b, 2H), 2.57-2.62 (m, 8H), 2.96-3.03 (m, 4H), 3.56 (b, 8H), 4.93 (t, 2H, J=8 Hz), 5.47 (d, 2H, J=8 Hz). $^{13}$C NMR (100 MHZ, CDCl$_3$) δ 168.76, 155.02, 80.06, 53.10, 49.11, 45.84, 41.81, 38.20, 28.35, 5.93. LC-MS (ESI$^+$) m/z 657.09 [M+H]$^+$.

The above compound (28 mg, 0.04 mmol) was dissolved in 120 uL of MeOH and cooled to 0° C. 4 M HCl/dioxane (192 uL, 0.77 mmol) in four portions was added to the chilled solution every half an hour and the solution was warmed to room temperature after each addition. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give a yellowish white solid (19 mg, 80%). 1H NMR (400 MHZ, D2O) δ 1.03 (s, 8H), 2.91 (b, 2H), 3.30-3.86 (m, 20H), 4.69 (b, 2H). 13C NMR (100 MHz, D2O) δ 166.51, 51.88, 49.81, 42.57, 39.47, 37.86, 3.64. LC-MS (ESI+) m/z 457.3 [M+H]+. HRMS (ESI+) m/z calculated for C20H37N6O2S2+ [M+H]+457.2414, found 457.2444.

Example 4 L-Cystine bis(N'-cyclopentylpiperazide) tetrahydrochloride (LH1731)

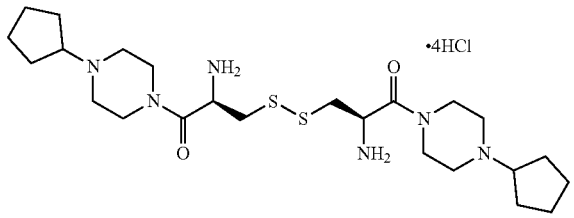 [SMILES: N[C@@H](CSSC[C@H](N)C(=O)N1CCN(C2CCCC2)CC1)C(=O)N1CCN(C2CCCC2)CC1]

Boc-L-cystine-OH (70 mg, 0.16 mmol) was suspended in 2 mL of dry DCM. DIEA (168 uL, 0.96 mmol) was added and gave a clear solution. Then 1-cyclopentyl piperazine (75 uL, 0.48 mmol) and PyAOP (174 mg, 0.33 mmol) were added to the solution and the reaction mixture was left to stir at room temperature for 30 min. The mixture was diluted with (20 mL) of water and extracted with (3×40 mL) of DCM. The combined organic layers were washed with (15 mL) of brine and dried over Na$_2$SO$_4$. The solvent was evaporated under reduced pressure and the residue was purified via ISCO (20% MeOH: DCM+0.1% TEA/DCM) and the product was eluted at 25%. The solvent was evaporated under reduced pressure to give a light yellow solid (85 mg, 75% yield). $^1$H NMR (400 MHZ, CDCl$_3$) δ 1.41 (s, 18H), 1.48-1.58 (m, 8H), 1.74 (b, 4H), 1.89 (b, 4H), 2.68 (b, 8H), 2.98 (b, 4H), 3.01-3.15 (m, 2H), 3.75 (b, 8H), 4.91 (b, 2H), 5.44 (d, 2H, J=8 Hz). $^{13}$C NMR (100 MHZ, CDCl$_3$) δ 168.80, 155.05, 80.26, 67.55, 52.12, 51.58, 48.99, 45.82, 41.49, 29.74, 28.34, 23.92. LC-MS (ESI$^+$) m/z 713.19 [M+H]$^+$.

The above compound (36 mg, 0.05 mmol) was dissolved in 150 uL of MeOH and cooled to 0° C. 4 M HCl/dioxane (150 uL, 0.6 mmol) in four portions was added to the chilled solution every half an hour and the solution was warmed to room temperature after each addition. There was still some mono-deprotected product so additional 4 M HCl/dioxane (75 uL, 0.3 mmol) was added to the solution at 0° C. and the solution was warmed to room temperature and left to stir for 1 h. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give a yellowish white solid (25 mg, 76% yield). 1H NMR (400 MHZ, D2O) δ 1.64-1.83 (m, 14H), 2.18 (b, 4H), 3.16-3.43 (m, 10H), 3.60-3.82 (m, 10H), 4.24 (b, 2H). 13C NMR (100 MHZ, D2O) δ 166.23, 68.22, 50.17, 49.74, 42.77, 39.72, 27.84, 23.34. LC-MS (ESI+) m/z 513.32 [M+H]+. HRMS (ESI+) m/z calculated for C24H45N6O2S2+ [M+H]+513.3040, found 513.3069.

Example 5 L-Cystine bis(2',2'-dimethylpiperazide) tetrahydrochloride (LH1733)

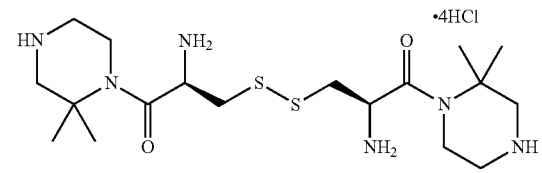 [SMILES: CC1(C)CNCCN1C(=O)[C@@H](N)CSSC[C@H](N)C(=O)N1CCNCC1(C)C]

Boc-L-cystine-OH (70 mg, 0.16 mmol) was suspended in 2 mL of dry DCM. DIEA (168 uL, 0.96 mmol) was added and gave a clear solution. Then tert-butyl 2,2-dimethyl piperazine-1-carboxylate (103 mg, 0.48 mmol) and PyAOP (174 mg, 0.33 mmol) were added to the solution and the reaction mixture was left to stir at room temperature for 30 min. The mixture was diluted with (20 mL) of water and extracted with (3×40 mL) of DCM. The combined organic layers were washed with (15 mL) of brine and dried over Na2SO4. Solvent was evaporated under reduced pressure and the yellow residue was purified via ISCO (5% MeOH: DCM+0.1% TEA/DCM) and the product was eluted at 45%. Solvent was evaporated under reduced pressure to give a colorless oil (80 mg, 60% yield). 1H NMR (400 MHZ, CDCl3) δ 1.36 (s, 12H), 1.41 (s, 18H), 1.46 (s, 18H), 2.99 (b, 4H), 3.48-3.88 (m, 12H), 4.88 (b, 2H), 5.32 (b, 2H). 13C NMR (100 MHz, CDCl$_3$) δ 170.93, 155.11, 154.80, 80.31, 56.11, 54.05, 50.56, 49.34, 45.32, 43.96, 39.81, 28.35, 25.03. LC-MS (ESI+) m/z 832.98 [M+H]+.

The above compound (7 mg, 0.009 mmol) was dissolved in 50 uL of MeOH and cooled to 0° C. 4 M HCl/dioxane (50 uL, 0.2 mmol) in four portions was added to the chilled solution every half an hour and the solution was warmed to room temperature after each addition. There was still some mono-deprotected product so additional 4 M HCl/dioxane (25 uL, 0.1 mmol) was added to the solution at 0° C. and the solution was warmed to room temperature and left to stir for 1 h. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give a white solid (4 mg, 80% yield). 1H NMR (400 MHZ, D2O) δ 1.41-1.50 (m, 12H), 3.34-3.50 (m, 10H), 3.65-4.02 (m, 6H), 4.28 (b, 2H). 13C NMR (100 MHz, D2O) δ 167.11, 55.09, 52.51, 49.72, 42.30, 39.06, 38.03, 22.45, 20.65. LC-MS (ESI+) m/z 433.3 [M+H]+. HRMS (ESI+) m/z calculated for C18H37N6O2S2+ [M+H]+433.2414, found 433.2444.

Example 6 L-Cystine bis (N',N'-dimethylethyleneamide) tetrahydrochloride (LH1734)

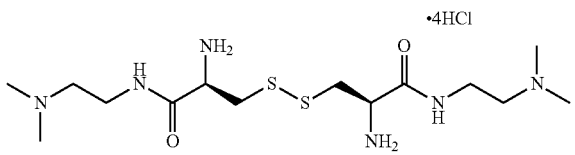

Boc-L-cystine-OH (200 mg, 0.45 mmol) was suspended in 6 mL of dry DCM. DIEA (488 uL, 2.8 mmol) was added and gave a clear solution. Then N,N-dimethylethylenediamine (151 uL, 1.38 mmol) and PyAOP (522 mg, 1 mmol) were added to the solution and the reaction mixture was left to stir at room temperature for 30 min. The mixture was diluted with (40 mL) of water and extracted with (3×80 mL) of DCM. The combined organic layers were washed with (30 mL) of brine and dried over Na2SO4. The solvent was evaporated under reduced pressure and the residue was purified via ISCO (20% MeOH: DCM+0.1% TEA/DCM) and the product was eluted at 70%. The solvent was evaporated under reduced pressure to give a yellowish white solid (250 mg, 95% yield). 1H NMR (400 MHZ, DMSO) δ 1.36 (s, 18H), 2.40 (s, 12H), 2.64 (t, 4H, J=4 Hz), 2.83 (dd, 2H, J=8, 12 Hz), 3.08 (dd, 2H, J=4, 12 Hz), 3.24 (b, 4H), 4.14 (b, 2H), 7.05 (d, 2H, J=8 Hz), 8.01 (b, 2H). 13C NMR (100 MHz, DMSO) δ 170.44, 155.24, 78.36, 56.77, 53.64, 43.83, 40.54, 35.63, 28.12. LC-MS (ESI+) m/z 581.2 [M+H]+.

The above compound (241 mg, 0.42 mmol) was dissolved in 1 mL of MeOH and cooled to 0° C. 4 M HCl/dioxane (1.3 mL, 5.1 mmol) in two portions was added to the chilled solution every half an hour and the solution was warmed to room temperature after each addition. There was still some mono-deprotected product so additional 4 M HCl/dioxane (1.3 mL, 5.1 mmol) was added to the solution at 0° C. and the solution was warmed to room temperature and left to stir for 1 h. The solvent was evaporated under reduced pressure and the residue was dried on pump. Residue then was dissolved in a minimal amount of methanol and re-crystallized with an excess of diethyl ether then was filtrated with additional washes of diethyl ether. Residue was collected and dried to give a yellowish white solid (160 mg, 73% yld). 1H NMR (400 MHZ, D2O) δ 2.99 (s, 12H), 3.23-3.29 (m, 2H), 3.39 (t, 4H, J=4 Hz), 3.45-3.50 (m, 2H), 3.58-3.68 (m, 2H), 3.77-3.83 (m, 2H), 4.44 (dd, 2H, J=8, 12 Hz). 13C NMR (100 MHz, D2O) δ 168.79, 56.14, 52.03, 43.25, 37.14, 35.00. LC-MS (ESI+) m/z 381.21 [M+H]+. HRMS (ESI+) m/z calculated for C14H33N6O2S2+ [M+H]+381.2101, found 381.2125.

Example 7 L-Cystine bis(N'-pyrrolidinoethyleneamide) tetrahydrochloride (LH1735)

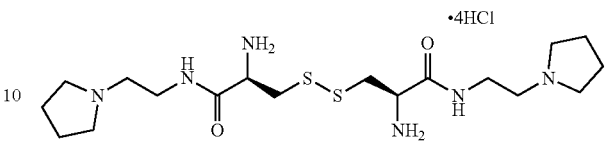

Boc-L-cystine-OH (70 mg, 0.16 mmol) was suspended in 2 mL of dry DCM. DIEA (168 uL, 0.96 mmol) was added and gave a clear solution. Then N-(2-aminoethyl) pyrrolidine (61 uL, 0.48 mmol) and PyAOP (174 mg, 0.33 mmol) were added to the solution and the reaction mixture was left to stir at room temperature for 30 min. The mixture was diluted with (20 mL) of water and extracted with (2×50 mL) of DCM. The combined organic layers were washed with (15 mL) of brine and dried over Na2SO4. The solvent was evaporated under reduced pressure and the yellow residue was purified via ISCO (10% MeOH: DCM+0.1% TEA/DCM) and the product was eluted at 60%. The solvent was evaporated under reduced pressure to give a white solid (82 mg, 81%). 1H NMR (400 MHZ, CDCl3) δ 1.26 (s, 18H), 1.68 (b, 8H), 2.60 (b, 12H), 2.86-3.10 (m, 4H), 3.30 (b, 4H), 4.47 (b, 2H), 5.65 (b, 2H), 7.64 (b, 2H). 13C NMR (100 MHz, CDCl3) δ 170.50, 155.54, 79.86, 54.70, 54.24, 53.96, 44.24, 37.89, 28.28, 23.31. LC-MS (ESI+) m/z 633.26 [M+H]+.

The above compound (31 mg, 0.05 mmol) was dissolved in 150 uL of MeOH and cooled to 0° C. 4 M HCl/dioxane (330 uL, 1.3 mmol) in two portions was added to the chilled solution every half an hour and the solution was warmed to room temperature after each addition. There was still some mono-deprotected product so additional 4 M HCl/dioxane (330 uL, 1.3 mmol) was added to the solution in two portions at 0° C. and the solution was warmed to room temperature and left to stir for 1 h. The solvent was evaporated under reduced pressure and the residue was dried on pump. The yellow residue then was dissolved in a minimal amount of methanol and recrystallized with an excess of diethyl ether then the vial was centrifuged and the solvent was decanted; this purification step was repeated six times. The residue was dried to give a yellow solid (25 mg, 86%). 1H NMR (400 MHZ, D2O) δ 2.01 (b, 4H), 2.16 (b, 4H), 3.15-3.25 (m, 6H), 3.45 (b, 6H), 3.57 (b, 2H), 3.73 (b, 6H), 4.41 (b, 2H). 13C NMR (100 MHZ, D2O) δ 168.70, 54.66, 53.34, 51.99, 37.07, 36.08, 22.68. LC-MS (ESI+) m/z 433.3 [M+H]+. HRMS (ESI+) m/z calculated for C18H37N6O2S2+ [M+H]+433.2414, found 433.2439.

Example 8 L-Cystine bis(N'-pyrrolidin-2-oneethyleneamide) dihydrochloride (LH1736)

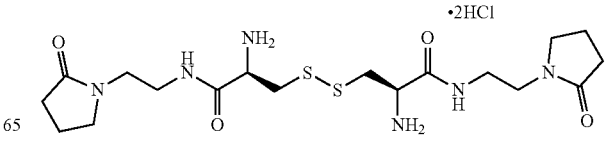

Boc-L-cystine-OH (70 mg, 0.16 mmol) was suspended in 2 mL of dry DCM. DIEA (168 uL, 0.96 mmol) was added and gave a clear solution. Then N-(2-aminoethyl) pyrrolidine (61 uL, 0.48 mmol) and PyAOP (174 mg, 0.33 mmol) were added to the solution and the reaction mixture was left to stir at room temperature for 30 min. The mixture was diluted with (20 mL) of water and extracted with (2×50 mL) of DCM. The combined organic layers were washed with (15 mL) of brine and dried over Na2SO4. The solvent was evaporated under reduced pressure and the yellow residue was purified via ISCO (10% MeOH: DCM+0.1% TEA/DCM) and the product was eluted at 60%. The solvent was evaporated under reduced pressure to give a white solid (82 mg, 81%). 1H NMR (400 MHZ, CDCl3) δ 1.43 (s, 18H), 1.95-2.01 (m, 4H), 2.34 (t, 4H, J=8 Hz), 2.98 (b, 4H), 3.34-3.52 (m, 12H), 4.60 (b, 2H), 5.58 (b, 2H), 7.94 (b, 2H). 13C NMR (100 MHz, CDCl3) δ 175.86, 170.69, 155.61, 80.24, 54.52, 47.34, 44.77, 42.13, 37.08, 31.02, 28.38, 18.03. LC-MS (ESI+) m/z 661.41 [M+H]+.

The above compound (90 mg, 0.13 mmol) was dissolved in 350 uL of MeOH and cooled to 0° C. 4 M HCl/dioxane (920 uL, 3.68 mmol) in four portions was added to the chilled solution every half an hour and the solution was warmed to room temperature after each addition. The solvent was evaporated under reduced pressure and the residue was dried on pump. The yellow residue then was dissolved in a minimal amount of methanol and recrystallized with an excess of diethyl ether then the vial was centrifuged and the solvent was decanted; this purification step was repeated three times. The residue was dried to give a yellowish white solid (67 mg, 99%). 1H NMR (400 MHZ, D2O) δ 2.04 (b, 4H), 2.44 (b, 4H), 3.12-3.19 (m, 2H), 3.28-3.61 (m, 14H), 4.32 (b, 2H). 13C NMR (100 MHZ, D2O) δ 178.87, 167.90, 51.93, 47.91, 41.84, 37.22, 36.93, 31.13, 17.39. LC-MS (ESI+) m/z 461.43 [M+H]+. HRMS (ESI+) m/z calculated for C18H33N6O2S2+ [M+H]+461.2000, found 461.2028.

Example 9 L-Cystine bis(N'-piperidinoethyleneamide) tetrahydrochloride (LH1737)

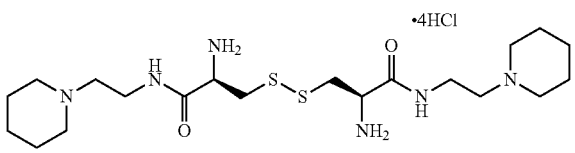 [SMILES: N[C@@H](CSSC[C@H](N)C(=O)NCCN1CCCCC1)C(=O)NCCN1CCCCC1]

Boc-L-cystine-OH (70 mg, 0.16 mmol) was suspended in 2 mL of dry DCM. DIEA (168 uL, 0.96 mmol) was added and gave a clear solution. Then 1-(2-aminoethyl)piperidine (69 uL, 0.48 mmol) and PyAOP (174 mg, 0.33 mmol) were added to the solution and the reaction mixture was left to stir at room temperature for 30 min. The mixture was diluted with (20 mL) of water and extracted with (2×50 mL) of DCM. The combined organic layers were washed with (15 mL) of brine and dried over Na2SO4. The solvent was evaporated under reduced pressure and the yellow residue was purified via ISCO (5% MeOH: DCM+0.1% TEA/DCM) and the product was eluted at 80%. The solvent was evaporated under reduced pressure to give a yellowish white solid (95 mg, 90%). 1H NMR (400 MHz, CDCl3) δ 1.37 (s, 22H), 1.59 (b, 8H), 2.54 (b, 12H), 2.96-3.10 (m, 4H), 3.38 (b, 4H), 4.53 (b, 2H), 5.65 (d, 2H, J=8 Hz), 7.65 (b, 2H). 13C NMR (100 MHz, CDCl3) δ 170.42, 155.53, 79.99, 57.22, 55.24, 54.22, 43.89, 36.11, 28.34, 25.06, 23.62. LC-MS (ESI+) m/z 661.33 [M+H]+.

The above compound (38 mg, 0.06 mmol) was dissolved in 150 uL of MeOH and cooled to 0° C. 4 M HCl/dioxane (404 uL, 1.62 mmol) in two portions was added to the chilled solution every half an hour and the solution was warmed to room temperature after each addition. There was still some mono-deprotected product so additional 4 M HCl/dioxane (404 uL, 1.62 mmol) was added to the solution in two portions at 0° C. and the solution was warmed to room temperature and left to stir for 1 h. The solvent was evaporated under reduced pressure and the residue was dried on pump. The residue then was dissolved in a minimal amount of methanol and recrystallized with an excess of diethyl ether then the vial was centrifuged and the solvent was decanted; this purification step was repeated six times. The residue was dried to give a yellow solid (31 mg, 86%). 1H NMR (400 MHZ, D2O) δ 1.15-1.19 (m, 2H), 1.46-1.53 (m, 6H), 1.96 (b, 4H), 3.00 (b, 4H), 3.19-3.25 (m, 2H), 3.32 (b, 4H), 3.41-3.47 (m, 2H), 3.55-3.64 (m, 6H), 3.71-377 (m, 2H), 4.41 (b, 2H). 13C NMR (100 MHz, D2O) δ 168.62, 55.06, 53.64, 51.98, 37.08, 34.47, 22.76, 21.00. LC-MS (ESI+) m/z 461.4 [M+H]+. HRMS (ESI+) m/z calculated for C20H41N6O2S2+ [M+H]+461.2727, found 461.2755.

Example 10 L-Cystine bis(N'-morpholinoethyleneamide) tetrahydrochloride (LH1738)

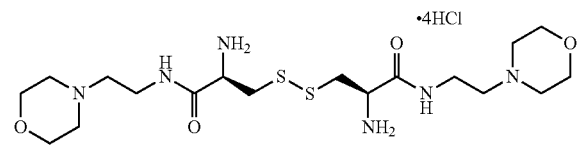 [SMILES: N[C@@H](CSSC[C@H](N)C(=O)NCCN1CCOCC1)C(=O)NCCN1CCOCC1]

Boc-L-cystine-OH (70 mg, 0.16 mmol) was suspended in 2 mL of dry DCM. DIEA (168 uL, 0.96 mmol) was added and gave a clear solution. Then 4-(2-aminoethyl) morpholine (63 uL, 0.48 mmol) and PyAOP (174 mg, 0.33 mmol) were added to the solution and the reaction mixture was left to stir at room temperature for 30 min. The mixture was diluted with (20 mL) of water and extracted with (2×50 mL) of DCM. The combined organic layers were washed with (15 mL) of brine and dried over Na2SO4. The solvent was evaporated under reduced pressure and the residue was purified via ISCO (20% MeOH: DCM+0.1% TEA/DCM) and the product was eluted at 35%. The solvent was evaporated under reduced pressure to give a white solid (85 mg, 80%). 1H NMR (400 MHZ, CDCl3) δ 1.44 (s, 18H), 2.44-2.50 (m, 12H), 2.97-3.01 (m, 4H), 3.29-3.45 (m, 4H), 3.67 (t, 8H, J=4 Hz), 4.66 (b, 2H), 5.63 (d, 2H, J=12 Hz), 7.51 (b, 2H). 13C NMR (100 MHZ, CDCl3) δ 170.18, 155.73, 80.16, 66.91, 57.45, 54.49, 53.53, 45.29, 36.43, 28.42. LC-MS (ESI+) m/z 665.3 [M+H]+.

The above compound (55 mg, 0.08 mmol) was dissolved in 300 uL of MeOH and cooled to 0° C. 4 M HCl/dioxane (376 uL, 1.5 mmol) in four portions was added to the chilled solution every half an hour and the solution was warmed to room temperature after each addition. There was still some mono-deprotected product so additional 4 M HCl/dioxane (188 uL, 0.74 mmol) was added to the solution at 0° C. and warmed to room temperature and left to stir for 30 m. Solvent was evaporated under reduced pressure and the residue was dried on pump. The residue then was dissolved in a minimal amount of methanol and recrystallized with an excess of diethyl ether then the vial was centrifuged and the solvent was decanted; this purification step was repeated four times. The residue was dried to give a yellow solid (49 mg, 100%). 1H NMR (400 MHZ, D2O) δ 3.20-3.28 (m, 6H), 3.43-3.50 (m, 6H), 3.60-3.68 (m, 6H), 3.77-3.89 (m, 6H), 4.13 (b, 4H), 4.42-4.45 (m, 2H). 13C NMR (100 MHZ, D2O) δ 168.70, 63.71, 55.57, 52.06, 51.95, 37.01, 34.11. LC-MS (ESI+) m/z 465.37 [M+H]+. HRMS (ESI+) m/z calculated for C18H37N6O4S2+ [M+H]+465.2313, found 465.2340.

Example 11 L-Cystine bis (N',N'-dimethyl-1',3'-diaminopropaneamide) tetrahydrochloride (LH1739)

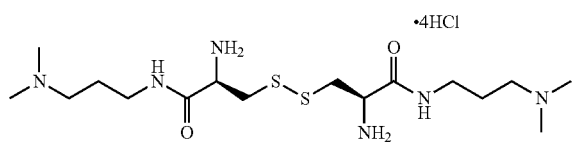

Boc-L-cystine-OH (70 mg, 0.16 mmol) was suspended in 2 mL of dry DCM. DIEA (168 uL, 0.96 mmol) was added and gave a clear solution. Then 3-(dimethylamino)-1-propylamine (61 uL, 0.48 mmol) and PyAOP (174 mg, 0.33 mmol) were added to the solution and the reaction mixture was left to stir at room temperature for 30 min. The mixture was diluted with (20 mL) of water and extracted with (3×40 mL) of DCM. The combined organic layers were washed with (15 mL) of brine and dried over Na2SO4. Solvent was evaporated under reduced pressure and the residue purified via ISCO (20% MeOH: DCM+0.1% TEA/DCM) and the product eluted at 75%. Solvent was evaporated under reduced pressure to give a light yellow solid (55 mg, 58% yield). 1H NMR (400 MHZ, CDCl3) δ 1.45 (s, 18H), 1.64-1.72 (m, 4H), 2.20 (s, 12H), 2.31 (t, 4H, J=8 Hz), 2.94-3.02 (m, 4H), 3.25-3.33 (m, 4H), 4.69 (b, 2H), 5.61 (d, 2H, J=8 Hz), 7.90 (b, 2H). 13C NMR (100 MHz, DMSO) δ 170.07, 155.76, 80.08, 57.68, 54.51, 45.88, 45.41, 38.53, 28.41, 27.23. LC-MS (ESI+) m/z 609.23 [M+H]+.

The above compound (18 mg, 0.03 mmol) was dissolved in 100 uL of MeOH and cooled to 0° C. 4 M HCl/dioxane (90 uL, 0.35 mmol) in four portions was added to the chilled solution every half an hour and the solution was warmed to room temperature after each addition. There was still some mono-deprotected product so additional 4 M HCl/dioxane (90 uL, 0.35 mmol) was added in two portions to the solution at 0° C. and the solution warmed to room temperature and left to stir for 1 h. Solvent was evaporated via N2 and the residue was dried on pump. Residue then was dissolved in a minimal amount of methanol and recrystallized with an excess of diethyl ether then the vial was centrifuged and the solvent was decanted; this purification step was repeated three times. The residue was dried to give a yellowish white solid (11 mg, 68% yield). 1H NMR (400 MHZ, D2O) δ 1.99-2.03 (m, 4H), 2.91 (s, 12H), 3.19-3.28 (m, 6H), 3.35-3.43 (m, 6H), 4.36 (t, 2H, J=8 Hz). 13C NMR (100 MHz, D2O) δ 168.11, 55.34, 52.07, 42.87, 37.39, 36.68, 23.91. LC-MS (ESI+) m/z 409.26 [M+H]+. HRMS (ESI+) m/z calculated for C16H37N6O2S2+ [M+H]+ 409.2414, found 409.2438.

Example 12 L-Cystine bis(1'-pyrrolidine-3'-aminopropaneamide) tetrahydrochloride (LH1740)

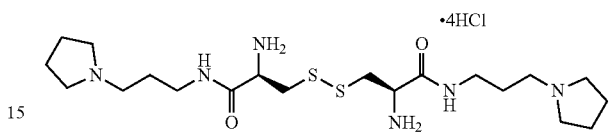

Boc-L-cystine-OH (70 mg, 0.16 mmol) was suspended in 2 mL of dry DCM. DIEA (168 uL, 0.96 mmol) was added and gave a clear solution. Then 3-pyrrolidinopropylamine (66 uL, 0.48 mmol) and PyAOP (174 mg, 0.33 mmol) were added to the solution and the reaction mixture was left to stir at room temperature for 30 min. The mixture was diluted with (20 mL) of water and extracted with (2×50 mL) of DCM. The combined organic layers were washed with (15 mL) of brine and dried over Na2SO4. The solvent was evaporated under reduced pressure and the yellow residue was purified via ISCO (20% MeOH: DCM+0.1% TEA/DCM) and the product was eluted at 80%. The solvent was evaporated under reduced pressure to give a yellow solid (85 mg, 81%). 1H NMR (400 MHZ, CDCl3) δ 1.31 (s, 18H), 2.02 (b, 12H), 2.93 (b, 4H), 3.18 (b, 4H), 3.30 (b, 4H), 3.60 (b, 4H), 4.40 (b, 2H), 5.78 (b, 2H), 8.35 (b, 2H). 13C NMR (100 MHz, DMSO) δ 171.23, 155.33, 79.70, 54.14, 53.58, 52.94, 42.70, 36.55, 28.29, 25.59, 23.23. LC-MS (ESI+) m/z 661.33 [M+H]+.

The above compound (39 mg, 0.06 mmol) was dissolved in 150 uL of MeOH and cooled to 0° C. 4 M HCl/dioxane (400 uL, 1.6 mmol) in four portions was added to the chilled solution every half an hour and the solution was warmed to room temperature after each addition. The solvent was evaporated under reduced pressure and the residue was dried on pump. The residue then was dissolved in a minimal amount of methanol and recrystallized with an excess of diethyl ether then the vial was centrifuged and the solvent was decanted; this purification step was repeated six times. The residue was dried to give a yellow solid (16 mg, 45%). 1H NMR (400 MHZ, D2O) δ 2.02-2.09 (m, 8H), 2.16-2.24 (m, 4H), 3.11-3.17 (m, 4H), 3.27-3.33 (m, 6H), 3.36-3.46 (m, 6H), 3.70-3.76 (m, 4H), 4.40 (t, 2H, J=8 Hz). 13C NMR (100 MHz, D2O) δ 168.10, 54.34, 52.59, 52.16, 37.52, 36.89, 25.27, 22.73. LC-MS (ESI+) m/z 461.46 [M+H]+. HRMS (ESI+) m/z calculated for C20H41N6O2S2+ [M+H]+461.2727, found 461.2757.

Example 13 L-Cystine bis (1'-morpholine-3'-aminopropaneamide) tetrahydrochloride (LH1741)

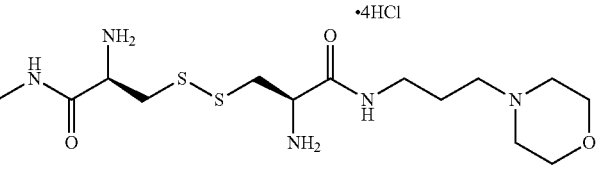

Boc-L-cystine-OH (70 mg, 0.16 mmol) was suspended in 2 mL of dry DCM. DIEA (168 uL, 0.96 mmol) was added and gave a clear solution. Then 4-(2-aminoethyl) morpholine (63 uL, 0.48 mmol) and PyAOP (174 mg, 0.33 mmol) were added to the solution and the reaction mixture was left to stir at room temperature for 30 min. The mixture was diluted with (20 mL) of water and extracted with (2×50 mL) of DCM. The combined organic layers were washed with (15 mL) of brine and dried over Na2SO4. The solvent was evaporated under reduced pressure and the residue was purified via ISCO (20% MeOH: DCM+0.1% TEA/DCM) and the product was eluted at 35%. The solvent was evaporated under reduced pressure to give a white solid (85 mg, 80%). 1H NMR (400 MHZ, CDCl3) δ 1.30 (s, 18H), 1.60-1.68 (m, 4H), 2.40 (b, 12H), 2.88 (b, 4H), 3.15-3.20 (m, 4H), 3.61 (b, 8H), 4.49 (b, 2H), 5.60 (b, 2H), 7.76 (b, 2H). 13C NMR (100 MHz, CDCl3) δ 170.27, 155.61, 79.99, 66.30, 56.48, 54.45, 53.46, 45.02, 38.09, 28.30, 25.56. LC-MS (ESI+) m/z 693.32 [M+H]+.

The above compound (60 mg, 0.09 mmol) was dissolved in 250 uL of MeOH and cooled to 0° C. 4 M HCl/dioxane (584 uL, 1.5 mmol) in four portions was added to the chilled solution every half an hour and the solution was warmed to room temperature after each addition. The solvent was evaporated under reduced pressure and the residue was dried on pump. The yellow residue then was dissolved in a minimal amount of methanol and recrystallized with an excess of diethyl ether then the vial was centrifuged and the solvent was decanted; this purification step was repeated six times. The residue was dried to give a yellow solid (40 mg, 85%). 1H NMR (400 MHZ, D2O) δ 2.06-2.12 (m, 4H), 3.27-3.33 (m, 10H), 3.41-3.48 (m, 6H), 3.62 (b, 4H), 3.89 (t, 4H, J=12 Hz), 4.20 (b, 4H), 4.42 (b, 2H). 13C NMR (100 MHz, D2O) δ 168.16, 63.88, 54.89, 52.14, 51.91, 37.50, 36.82, 23.09. LC-MS (ESI+) m/z 493.47 [M+H]+. HRMS (ESI+) m/z calculated for C20H41N6O4S2+ [M+H]+ 493.2625, found 493.2662.

Example 14 L-Cystine bis(4'-(dimethylamino)-piperidineamide) tetrahydrochloride (LH1751)

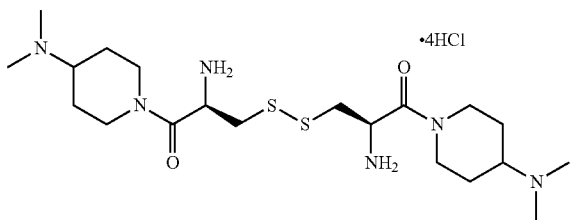

Boc-L-cystine-OH (50 mg, 0.11 mmol) was suspended in 1 mL of dry DCM. DIEA (119 uL, 0.68 mmol) was added and gave a clear solution. Then 4-(dimethylamino)piperidine (40 uL, 0.28 mmol) and PyAOP (125 mg, 0.24 mmol) were added to the solution and the reaction mixture was left to stir at room temperature for 30 m. The mixture was diluted with (15 mL) of water and extracted with (3×30 mL) of DCM. The combined organic layers were washed with (10 mL) of brine and dried over Na2SO4. The solvent was evaporated under reduced pressure and the residue was purified via ISCO (20% MeOH: DCM+0.3 N NH3/DCM) and the product was eluted at 35%. The solvent was evaporated under reduced pressure to give a colorless oil (68 mg, 94% yield). 1H NMR (400 MHZ, CDCl3) δ 1.40 (s, 22H), 1.85 (b, 4H), 2.24 (s, 12H), 2.34 (b, 2H), 2.58-2.67 (m, 2H), 2.92-3.09 (m, 6H), 4.07 (b, 2H), 4.54 (b, 2H), 4.93 (b, 2H), 5.46 (b, 2H). 13C NMR (100 MHZ, CDCl3) δ 168.61, 155.00, 80.02, 74.76, 61.83, 53.42, 49.10, 44.83, 41.60, 29.01, 28.33. LC-MS (ESI+) m/z 633.1 [M+H]+.

The above compound (24 mg, 0.036 mmol) was dissolved in 500 uL of MeOH and cooled to 0° C. 4 M HCl/dioxane (270 uL, 1.08 mmol) in two portions was added to the chilled solution every half an hour and the solution was warmed to room temperature after each addition. There was still mono-deprotected product so additional 4 M HCl/dioxane (270 uL, 1.08 mmol) was added to the solution at 0° C. and the solution was warmed to room temperature and left to stir for 3 h. The solvent was evaporated under reduced pressure and the residue was dried on pump. The residue then was dissolved in a minimal amount of methanol and recrystallized with an excess of diethyl ether and filtered. The residue was dried to give a white solid (22 mg, quantitative yield). 1H NMR (400 MHZ, D2O) δ 1.71-1.88 (m, 4H), 2.25-2.36 (m, 4H), 2.92 (d, 12H, J=4 Hz), 3.24-3.41 (m, 6H), 3.62 (b, 2H), 4.18 (b, 2H), 4.64 (b, 2H), 4.89-4.99 (m, 2H). 13C NMR (100 MHz, D2O) δ 166.16, 62.56, 49.91, 44.13, 41.34, 39.77, 26.25, 25.46. LC-MS (ESI+) m/z 461.3 [M+H]+. HRMS (ESI+) m/z calculated for C20H41N6O2S2+ [M+H]+461.2727, found 461.2757.

Example 15 L-Cystine bis(4'-(1"-Pyrrolidinyl)piperidine) tetrahydrochloride (LH1752)

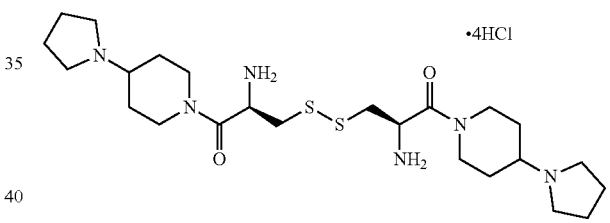

Boc-L-cystine-OH (50 mg, 0.11 mmol) was suspended in 1 mL of dry DCM. DIEA (119 uL, 0.68 mmol) was added and gave a clear solution. Then 4-(1-pyrrolidinyl)-piperidine (44 mg, 0.28 mmol) and PyAOP (125 mg, 0.24 mmol) were added to the solution and the reaction mixture was left to stir at room temperature for 30 m. The mixture was diluted with (15 mL) water and extracted with (3×30 mL) of DCM. The combined organic layers were washed with (10 mL) of brine and dried over Na2SO4. Solvent was evaporated under reduced pressure and the yellow residue was purified via ISCO (20% MeOH: DCM+0.3 N NH3/DCM) and the product was eluted at 30%. Solvent was evaporated under reduced pressure to give a colorless oil (70 mg, 90% yield). 1H NMR (400 MHZ, CDCl3) δ 1.40 (s, 20H), 1.76 (b, 8H), 1.92 (b, 4H), 2.25 (b, 4H), 2.55 (b, 8H), 2.76-3.15 (m, 8H), 4.01 (b, 2H), 4.40 (b, 2H), 4.94 (b, 2H), 5.50 (b, 2H). 13C NMR (100 MHz, CDCl3) δ 168.59, 155.11, 80.03, 74.76, 61.36, 51.39, 49.10, 44.24, 41.14, 31.93, 30.97, 28.34, 23.24. LC-MS (ESI+) m/z 633.1 [M+H]+.

The above compound (22 mg, 0.03 mmol) was dissolved in 500 uL of MeOH and cooled to 0° C. 4 M HCl/dioxane (232 uL, 0.93 mmol) in two portions was added to the chilled solution every half an hour and the solution was warmed to room temperature after each addition. There was still mono-deprotected product so additional 4 M HCl/ dioxane (232 uL, 0.93 mmol) was added to the solution at 0° C. and the solution was warmed to room temperature and left to stir for 3 h. The solvent was evaporated under reduced pressure and the residue was dried on pump. The residue then was dissolved in a minimal amount of methanol and recrystallized with an excess of diethyl ether and filtered. The residue was dried to give a white solid (20 mg, quantitative yield). 1H NMR (400 MHZ, D2O) δ 1.69-1.87 (m, 4H), 2.02 (b, 4H), 2.19 (b, 4H), 2.35-2.43 (m, 4H), 2.85-2.96 (m, 2H), 3.20-3.46 (m, 10H), 3.55 (b, 2H), 3.71 (b, 4H), 4.13 (b, 2H), 4.59 (b, 2H), 4.91-4.99 (m, 2H). 13C NMR (100 MHz, D2O) δ 165.86, 60.88, 51.76, 49.87, 43.90, 41.18, 28.52, 27.72, 22.48. LC-MS (ESI+) m/z 513.3 [M+H]+. HRMS (ESI+) m/z calculated for C24H45N6O2S2+ [M+H]+513.3040, found 513.3070.

Example 16 L-Cystine bis(1,8-Diazaspiro[4.5]decan-8-yl) tetrahydrochloride (LH1753)

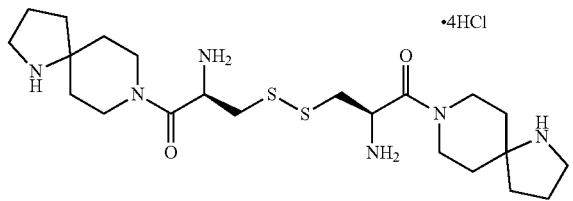 [SMILES: N[C@@H](CSSC[C@H](N)C(=O)N1CCC2(CCCN2)CC1)C(=O)N1CCC2(CCCN2)CC1]

Sodium carbonate (331 mg, 3.12 mmol) in 3 mL of water was added to a mixture of 1,8-Diazaspiro[4.5]decane-8-carboxylic acid tert-butyl ester (375 mg, 1.56 mmol) in 9 mL of dioxane and cooled to 0° C. Fmoc-Cl (605 mg, 2.34 mmol) was added to the chilled mixture then the reaction mixture was brought to room temperature and left to stir for 2 h then the mixture was kept in fridge for overnight. The mixture was concentrated as possible and diluted with (30 mL) of water and extracted with (3×60 mL) of DCM. The combined organic layers were washed with brine and dried over Na2SO4. The solvent was evaporated under reduced pressure and the yellow oil was purified via ISCO (50% EtOAc: hexane/hexane) and the product was eluted at 30%. The solvent was evaporated under reduced pressure to give a colorless oil (676 mg, 94%). 1H NMR (400 MHZ, CDCl3) δ 0.81 (b, 2H), 1.22 (b, 2H), 1.39 (s, 9H), 1.82 (b, 4H), 2.63 (b, 2H), 3.32-3.45 (m, 4H), 4.20 (b, 2H), 4.61 (b, 1H), 7.25 (t, 2H, J=8 Hz), 7.34 (t, 2H, J=8 Hz), 7.54 (d, 2H, J=8 Hz), 7.71 (d, 2H, J=8 Hz). 13C NMR (100 MHz, CDCl3) δ 154.58, 153.57, 144.24, 141.35, 127.61, 126.99, 125.08, 119.94, 79.40, 66.34, 62.84, 47.48, 42.09, 34.91, 32.91, 31.59, 28.47, 22.19. LC-MS (ESI+) m/z 633.1 [M+H]+.

The above compound (324 mg, 0.7 mmol) was dissolved in 3 mL of dioxane and cooled to 0° C. 4 M HCl/dioxane (4.7 mL, 18.92 mmol) was added to the chilled solution and the solution was warmed to room temperature and left to stir for 1.5 h. The solvent was evaporated under reduced pressure and the white residue was dried on pump. The residue then was dissolved in a minimal amount of methanol and recrystallized with an excess of diethyl ether and filtered. The residue was collected and dried to give a white solid (280 mg, quantitative yield). 1H NMR (400 MHZ, MeOD) δ 1.53 (d, 2H, J=12 Hz), 1.76 (t, 2H, J=8 Hz), 1.99 (t, 2H, J=8 Hz), 2.79 (t, 2H, J=12 Hz), 3.02 (t, 2H, J=12 Hz), 3.62-3.77 (m, 3H), 4.20 (dd, 2H, J=4, 8 Hz), 4.41 (t, 2H, J=8 Hz), 7.30 (t, 2H, J=8 Hz), 7.38 (t, 2H, J=8 Hz), 7.58 (d, 2H, J=8 Hz), 7.78 (d, 2H, J=8 Hz). 13C NMR (100 MHZ, MeOD) δ 145.39, 142.75, 128.82, 128.16, 126.01, 120.94, 67.62, 61.92, 47.40, 43.66, 36.22, 30.85, 23.00.

Boc-L-cystine-OH (97 mg, 0.22 mmol) was suspended in 3 mL of dry DCM. DIEA (460 uL, 2.64 mmol) was added and gave a clear solution. Then the compound prepared above (263 mg, 0.66 mmol) and PyAOP (286 mg, 0.55 mmol) were added to the solution and the reaction mixture was left to stir at room temperature for 3 h. The mixture was quenched with water and concentrated as possible under reduced pressure and the residue was dissolved in (50 mL) of EtOAc and washed with (2×25 mL) of water, (3×25 mL) of 0.5 N KHSO4, (25 mL) water, (5 mL) of brine and dried over Na2SO4. Solvent was evaporated under reduced pressure and the yellow residue was purified via ISCO (EtOAc/hexane) and the product was eluted at 70%. Solvent was evaporated under reduced pressure to give a white solid (248 mg, quantitative yield). 1H NMR (400 MHZ, DMSO) δ 1.33 (d, 22H, J=12 Hz), 1.73 (b, 4H), 1.92 (b, 4H), 2.34 (b, 4H), 2.50-3.08 (m, 8H), 3.20 (b, 4H), 3.99 (b, 2H), 4.24 (b, 2H), 7.25 (b, 2H), 7.32 (t, 4H, J=8 Hz), 7.40 (t, 4H, J=8 Hz), 7.60 (b, 4H), 7.88 (d, 4H, J=8 Hz). 13C NMR (100 MHz, DMSO) δ 168.12, 154.73, 152.55, 143.97, 140.75, 127.58, 127.06, 125.02, 120.05, 78.30, 65.58, 62.26, 49.50, 47.20, 46.76, 42.68, 34.40, 32.93, 32.07, 28.09, 21.59.

The above compound (177 mg, 0.15 mmol) was dissolved in 9 mL of anhydrous DCM and cooled to 0° C.) Piperidine (155 uL, 1.57 mmol) was added to the chilled solution and the reaction mixture was left to stir at room temperature for 7 h. The reaction mixture was cooled to 0° C. and additional piperidine (155 uL, 1.57 mmol) was added to the chilled solution and the reaction mixture was left to stir at room temperature for overnight. The solvent was evaporated and the yellow residue was purified via ISCO (10% MeOH/DCM) and the product was eluted at 90%. The solvent was evaporated under reduced pressure to give a colorless oil (70 mg, 70%). 1H NMR (400 MHZ, CDCl3) δ 1.41 (s, 18H), 1.73 (b, 2H), 1.89 (m, 2H), 2.17 (m, 12H), 2.81 (m, 2H), 3.00 (dd, 2H, J=4, 12 Hz), 3.17 (m, 2H), 3.27 (m, 2H), 3.45 (m, 2H), 3.50 (m, 2H), 4.02 (b, 2H), 4.46 (b, 2H), 5.05 (b, 2H), 5.38 (b, 2H), 9.98 (b, 2H). 13C NMR (100 MHz, CDCl$_3$) δ 169.54, 154.77, 80.18, 65.56, 47.78, 43.76, 43.30, 39.04, 38.74, 35.30, 33.82, 32.70, 28.32, 22.55.

The above compound (7 mg, 0.01 mmol) was dissolved in 50 uL of MeOH and cooled to 0° C. 4 M HCl/dioxane (76 uL, 0.3 mmol) in two portions was added to the chilled solution every half an hour and the solution was warmed to room temperature after each addition. The solvent was evaporated via N2 and the residue was dried on pump. The residue then was dissolved in a minimal amount of methanol and recrystallized with an excess of diethyl ether and filtered. The residue was dried to give a white solid (5 mg, quantitative yield). 1H NMR (400 MHZ, D2O) δ 1.95-2.20 (m, 12H), 3.19 (t, 2H, J=12 Hz), 3.25-3.47 (m, 10H), 3.51-3.62 (m, 2H), 3.90-3.98 (m, 2H), 4.08 (b, 2H), 4.29 (b, 2H), 4.91 (b, 2H). 13C NMR (100 MHz, D2O) δ 165.99, 65.81, 49.80, 44.40, 42.99, 39.98, 37.61, 33.46, 32.55, 22.30. LC-MS (ESI+) m/z 485.3 [M+H]+. HRMS (ESI+) m/z calculated for C22H41N6O2S2+ [M+H]+485.2727, found 485.2761.

Example 17 L-Cystine bis(1,8-Diazaspiro[4.5]decan-1-yl) tetrahydrochloride (LH1754)

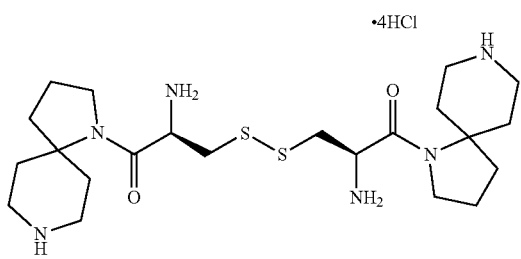 [SMILES: N[C@@H](CSSC[C@H](N)C(=O)N1CCCC12CCNCC2)C(=O)N1CCCC12CCNCC2]

Boc-L-cystine-OH (120 mg, 0.272 mmol) was suspended in 4 mL of dry DCM. DIEA (285 uL, 1.63 mmol) was added and gave a clear solution. Then 1,8-Diazaspiro[4.5]decane-8-carboxylic acid tert-butyl ester (327 mg, 1.36 mmol) and PyAOP (355 mg, 0.68 mmol) were added to the solution and the reaction mixture was left to stir at room temperature for 3 h. The mixture was diluted with (10 mL) of water and extracted with (3×25 mL) of DCM and the combined organic layers were washed with brine and dried over Na2SO4. The solvent was evaporated under reduced pressure and the yellow residue was purified via ISCO (20% MeOH: DCM+0.3 N NH3/DCM) and the product was eluted at 25%. The solvent was evaporated under reduced pressure to give a colorless oil (80 mg, 33%). 1H NMR (400 MHZ, CDCl3) δ 1.21-1.25 (m, 4H), 1.41 (d, 36H, J=8 Hz), 1.86-2.05 (m, 8H), 2.70-2.98 (m, 12H), 3.61 (b, 2H), 3.70 (b, 2H), 4.01 (b, 2H), 4.10 (b, 2H), 4.65 (b, 2H), 5.34 (b, 2H). 13C NMR (100 MHz, CDCl$_3$) δ 168.87, 155.21, 154.52, 79.96, 79.42, 65.18, 52.42, 48.72, 41.83, 40.98, 34.96, 32.43, 28.45, 28.33, 22.70.

The above compound (8 mg, 0.009 mmol) was dissolved in 50 uL of MeOH and cooled to 0° C. 4 M HCl/dioxane (76 uL, 0.3 mmol) in two portions was added to the chilled solution every half an hour and the solution was warmed to room temperature after each addition. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give a white solid (6 mg, quantitative yield). 1H NMR (400 MHZ, D2O) δ 1.75 (b, 4H), 1.97-2.10 (m, 6H), 2.15-2.22 (m, 2H), 2.90-2.96 (m, 4H), 3.07-3.18 (m, 6H), 3.38-3.47 (m, 6H), 3.66-3.72 (m, 2H), 3.77-3.82 (m, 2H), 4.57-4.60 (m, 2H). 13C NMR (100 MHZ, D2O) δ 165.92, 64.06, 51.94, 49.04, 42.18, 36.78, 34.57, 28.72, 28.08, 22.32. LC-MS (ESI+) m/z. 485.3 [M+H]+. HRMS (ESI+) m/z calculated for C22H41N6O2S2+ [M+H]+485.2727, found 485, 2761.

Example 18 S—(((R)-2-Amino-3-(4-methylpiperazin-1-yl)-3-oxopropyl) thio)-L-cysteine trihydrochloride (LH1727)

Boc-L-cystine-OH (1 g. 2.27 mmol) was suspended in 10 mL of anhydrous DCM. Tert-butyl-2,2,2-trichloroacetimidate (1.2 mL, 6.81 mmol) was added to the mixture and the reaction mixture was stirred at room temperature for 4 h. Additional tert-butyl-2,2,2-trichloroacetimidate (0.6 mL, 3.4 mmol) was added to the mixture and the reaction mixture was stirred at room temperature for 1 h. The reaction mixture was filtered and washed with DCM and 3% EtOAc/hexane. The filtrate was evaporated under reduced pressure and the residue was purified via ISCO (50% EtOAc: hexane/hexane) and the product was eluted at 20%. The solvent was evaporated under reduced pressure to give diBoc-L-cystine di (t-butyl) ester as a colorless oil (760 mg, 61%). 1H NMR (400 MHZ, CDCl3) δ 1.45 (d, 36H, J=12 Hz), 3.09-3.22 (m, 4H), 4.45 (b, 2H), 5.33 (b, 2H). 13C NMR (100 MHZ, CDCl3) δ 169.63, 155.06, 82.70, 79.96, 53.81, 42.12, 28.33, 27.99.

The above compound (693 mg, 1.25 mmol), triphenyl phosphine (428 mg, 1.63 mmol), sodium acetate (41 mg, 0.7 mmol) were suspended in a mixture of 6 mL of MeOH, 3 mL of water, and 30 uL of glacial acetic acid and heated to 60° C. for 75 m. The mixture was concentrated as possible and diluted with (200 mL) of DCM and washed with (2×100 mL) of water, brine and dried over Na$_2$SO$_4$. The solvent was evaporated under reduced pressure and the yellow residue was purified via ISCO (50% EtOAc: hexane/hexane) and the product was eluted at 10%. The solvent was evaporated under reduced pressure to give Boc-L-cystine t-butyl ester as a white solid (600 mg, 87%). 1H NMR (400 MHZ, CDCl$_3$) δ 1.45 (d, 19H, J=12 Hz), 2.90-2.95 (m, 2H), 4.45 (b, 1H), 5.40 (b, 1H). 13C NMR (100 MHZ, CDCl$_3$) δ 169.29, 155.14, 82.67, 79.97, 55.09, 28.30, 28.01, 27.53.

Boc-L-cystine-OH (1 g. 2.27 mmol) was suspended in 25 mL of anhydrous DCM. DIEA (2.4 mL, 13.62 mmol) was added and gave a clear solution. Then 1-methyl piperazine (756 uL, 6.81 mmol) and PyAOP (2.9 g, 5.6 mmol) were added to the solution and the reaction mixture was left to stir at room temperature for 2 h. The mixture was diluted with (100 mL) of water and extracted with (2×200 mL) of DCM. The combined organic layers were washed with brine and dried over Na$_2$SO$_4$. The solvent was evaporated under reduced pressure and the yellow residue was purified via ISCO (20% MeOH: DCM+0.3 N NH3/DCM) and the product was eluted at 90%. The solvent was evaporated under reduced pressure to give di-tert-butyl ((2R,2'R)-disulfanediylbis (3-(4-methylpiperazin-1-yl)-3-oxopropane-1,2-diyl)) di-carbamate (diBoc-LH708) as a light yellow oil (1250 mg, 91%). 1H NMR (400 MHZ, CDCl$_3$) δ 1.40 (s, 18H), 2.27 (s, 6H), 2.35-2.41 (m, 8H), 2.92-3.04 (m, 4H), 3.61 (b, 8H), 4.92 (b, 2H), 5.53 (b, 2H). 13C NMR (100 MHZ, CDCl3) δ 168.80, 155.02, 80.05, 54.53, 49.05, 45.74, 42.22, 41.67, 28.34.

The di-Boc protected L-cystine diamide obtained above (1071 mg, 1.77 mmol), triphenyl phosphine (604 mg, 2.3 mmol), sodium acetate (58 mg, 0.7 mmol) were suspended in a mixture of 10 mL of MeOH, 5 mL of water, and 42 uL of glacial acetic acid and heated to 60° C. for 75 m. The mixture was concentrated as possible and diluted with (300 mL) of DCM and washed with (2×100 mL) of water, brine and dried over Na$_2$SO$_4$. The solvent was evaporated under reduced pressure and the light yellow oil was purified via ISCO (20% MeOH: DCM+0.3 N NH3/DCM) and the product was eluted at 35%. The solvent was evaporated under reduced pressure to give Boc-L-cysteine amide as a colorless oil (900 mg, 84%). 1H NMR (400 MHZ, CDCl$_3$) δ 1.39 (s, 9H), 1.50 (t, 1H, J=8 Hz), 2.25 (s, 3H), 2.33-2.38 (m, 4H), 2.62-2.86 (m, 2H), 3.54-3.61 (m, 4H), 4.70 (b, 2H), 5.59 (d, 2H, J=12 Hz). 13C NMR (100 MHz, CDCl$_3$) δ 168.58, 155.10, 80.02, 54.61, 51.63, 45.70, 42.18, 28.30, 27.39.

To a stirred solution of 1-chlorobenzotriazole (74 mg, 0.48 mmol) and benzotriazole (29 mg, 0.24 mmol) in 8 mL of anhydrous DCM under Argon at −78° C. was added dropwise during 10 min a solution of the above Boc-L- cysteine amide (73 mg, 0.24 mmol) in 2 mL of anhydrous DCM. After 30 m, a solution of thiourea (54 mg, 0.72 mmol) in 6 mL of anhydrous THF was added and the reaction mixture was left to stir at −78° C. for further 15 m. Boc-L-cystine t-butyl ester obtained above (100 mg, 0.36 mmol) in 2 mL of anhydrous DCM was added slowly at −78° C. and the reaction mixture was warmed slowly to room temperature and left to stir for overnight. The reaction mixture was filtered with additional DCM washes and the filtrate was evaporated under reduced pressure. The residue was purified via ISCO (20% MeOH: DCM+0.3 N NH3/DCM) and the product was eluted at 25%. The solvent was evaporated under reduced pressure to give diBoc L-cystine monamide mono (t-butyl) ester as a colorless oil (80 mg, 58%). $^1$H NMR (400 MHZ, CDCl$_3$) δ 1.40 (d, 27H, J=12 Hz), 2.26 (s, 3H), 2.34-2.41 (m, 4H), 2.83-3.16 (m, 4H), 3.60 (b, 4H), 4.39 (b, 1H), 4.87-4.93 (m, 1H), 5.43 (b, 2H). $^{13}$C NMR (100 MHZ, CDCl$_3$) δ 169.55, 168.91, 155.05, 82.70, 80.13, 55.02, 54.45, 53.93, 48.98, 45.80, 42.08, 28.35, 27.98.

The above compound (15 mg, 0.025 mmol) was dissolved in 100 uL of dioxane and cooled to 0° C.) 4 M HCl/dioxane (324 uL, 1.3 mmol) in two portions was added to the chilled solution every half an hour and the solution was warmed to room temperature after each addition. The reaction mixture was left to shake at room temperature overnight. The solvent was evaporated via N2 and the residue was dried on pump. The residue then was dissolved in a minimal amount of methanol and recrystallized with an excess of diethyl ether then the vial was centrifuged and the solvent was decanted; this purification step was repeated three times. The residue was dried to give the target compound (LH1727) as a white solid (11 mg, quantitative yield). $^1$H NMR (400 MHZ, D$_2$O) δ 2.83 (d, 3H, J=8 Hz), 3.18-3.48 (m, 8H), 3.67-3.80 (m, 4H), 4.23 (b, 1H), 4.37 (b, 1H). $^{13}$C NMR (100 MHZ, D$_2$O) δ 171.56, 166.67, 52.49, 49.52, 43.00, 42.47, 39.59, 37.09, 36.55. LC-MS (ESI$^+$) m/z 323.2 [M+H]$^+$. HRMS (ESI$^+$) m/z calculated for C11H23N4O3S2 [M+H]$^+$ 323.1206, found 323.1233.

Example 19 meso-Cystine dimethyl ester dihydrochloride (LH1728)

D-Cystine-OH (500 mg, 2.1 mmol) was dissolved in 10 mL of methanol and cooled to 0° C.) Thionyl chloride (1 mL, 12.5 mmol) was added slowly to the solution then the reaction mixture was brought to room temperature and left to stir for overnight. The solvent was evaporated under reduced pressure then redissolved in chloroform and evaporated again under reduced pressure which was repeated twice to help getting rid of thionyl chloride. The white foamy residue was then dried on pump for overnight to give D-Cystine dimethyl ester dihydrochloride as a white solid (701 mg, 98%). $^1$H NMR (400 MHZ, D$_2$O) δ 3.34-3.45 (m, 4H), 3.88 (s, 6H), 4.61 (b, 2H). $^{13}$C NMR (100 MHZ, D$_2$O) δ 169.13, 53.97, 51.56, 35.70.

D-Cystine dimethyl ester (670 mg, 1.96 mmol) was dissolved in dioxane/water (2:1, 6 mL). A solution of sodium carbonate (445 mg, 4.2 mmol) in 2 mL of water was added to the solution then the mixture was cooled to 0° C. Di-tert-butyl pyrocarbonate (1075 mg, 4.93 mmol) was added in one portion to the chilled mixture and then the reaction mixture was brought to room temperature and left to stir for 5 h. The reaction mixture was concentrated as possible under reduced pressure and then diluted with (15 mL) of EtOAc. The organic layer was washed with (2×5 mL) of water, (2×5 mL) of 0.5 N KHSO4, (3×5 mL) of saturated NaHCO$_3$ and (3 mL) of brine and dried over Na$_2$SO$_4$. The solvent was evaporated under reduced pressure to give diBoc D-Cystine dimethyl ester as a white solid (850 mg, 92%). $^1$H NMR (400 MHZ, CDCl3) δ 1.35 (s, 18H), 3.07 (b, 4H), 3.67 (s, 6H), 4.51 (b, 2H), 5.42 (b, 2H). $^{13}$C NMR (100 MHZ, CDCl$_3$) δ 170.94, 155.02, 80.08, 66.96, 52.49, 41.13, 28.21.

diBoc D-Cystine dimethyl ester obtained above (800 mg, 1.7 mmol), triphenyl phosphine (493 mg, 1.88 mmol), sodium acetate (56 mg, 0.68 mmol) were suspended in a mixture of 8 mL of MeOH, 3.5 mL of water, and 58 uL of glacial acetic acid and heated to 50° C. for 3 h. The mixture was concentrated as possible and diluted with (60 mL) of EtOAc and washed with (2×20 mL) of water, (10 mL) of brine and dried over Na$_2$SO$_4$. The solvent was evaporated under reduced pressure and the residue was purified via ISCO (EtOAc/hexane) and the product was eluted at 30%. The solvent was evaporated under reduced pressure to give Boc-D-cysteine methyl ester as a colorless oil (447 mg, 56%). 1H NMR (400 MHZ, CDCl$_3$) δ 1.41 (t, 1H, J=8 Hz), 1.44 (s, 9H), 2.94-2.99 (m, 2H), 3.77 (s, 3H), 4.61 (b, 1H), 5.42 (b, 1H). $^{13}$C NMR (100 MHZ, CDCl$_3$) δ 170.82, 155.10, 80.27, 54.84, 52.68, 28.28, 27.32.

To a stirred solution of 1-chlorobenzotriazole (262 mg, 1.7 mmol) and benzotriazole (102 mg, 0.85 mmol) in 22 mL of dry DCM under Argon at −78° C. was added dropwise during 10 m a solution of compound Boc-D-cysteine methyl ester (200 mg, 0.85 mmol) in 4 mL of dry DCM. After 15 min, a solution of thiourea (195 mg, 2.6 mmol) in 30 mL of anhydrous THF was added and the reaction mixture was left to stir at −78° C. for further 15 min. Boc-L-cysteine methyl ester (200 mg, 0.85 mmol) in 4 mL of dry DCM was added slowly at −78° C. and the reaction mixture was warmed slowly to room temperature and left to stir for overnight. The reaction mixture was evaporated under reduced pressure and the residue was dissolved in (200 mL) of EtOAc and washed with (4×50 mL) of water, (20 mL) of brine and dried over Na$_2$SO$_4$. The solvent was evaporated under reduced pressure and the pale white residue was purified via ISCO (50% EtOAc/hexane) and the product was eluted at 40%. The solvent was evaporated under reduced pressure to give diBoc meso-cystine dimethyl ester as a colorless oil (250 mg, 63%). 1H NMR (400 MHZ, CDCl$_3$) δ 1.44 (s, 18H), 3.10-3.26 (m, 4H), 3.76 (s, 6H), 4.61 (b, 2H), 5.38 (b, 2H). $^{13}$C NMR (100 MHZ, CDCl$_3$) δ 171.20, 155.07, 80.35, 52.66, 41.25, 28.30. LC-MS (ESI$^+$) m/z 469.45 [M+H]$^+$.

diBoc meso-cystine dimethyl ester (7 mg, 0.015 mmol) was dissolved in 50 uL of MeOH and cooled to 0° C. 4 M HCl/dioxane (68 uL, 0.27 mmol) in four portions was added to the chilled solution every half an hour and the solution was warmed to room temperature after each addition. Additional 4 M HCl/dioxane (17 uL, 0.07 mmol) was added to the chilled solution and the mixture was warmed to room temperature and left to shake for 30 m. The solvent was evaporated via N2 and the residue was dried on pump. The yellow residue then was dissolved in a minimal amount of methanol and recrystallized with an excess of diethyl ether then the vial was centrifuged and the solvent was decanted; this purification step was repeated three times. The residue was dried to give meso-cystine dimethyl ester dihydrochloride (LH1728) as a yellowish white solid (4 mg, 80%). $^1$H NMR (400 MHZ, D$_2$O) δ 3.39 (b, 4H), 3.86 (s, 6H), 4.58 (b, 2H). $^{13}$C NMR (100 MHZ, D$_2$O) δ 169.12, 53.88, 51.43, 35.59. LC-MS (ESI$^+$) m/z 269.1 [M+H]. HRMS (ESI$^+$) m/z calculated for C$_8$H$_{17}$N$_2$O$_4$S$_2$$^+$ [M+H]$^+$ 269.0624, found 269.0643.

Example 20 Synthesis of L-Cystine Monoamides Through Thiol-Sulfide Exchange Followed by Air Oxidation as Illustrated by the Synthesis of LH1727

L-Cystine diamide (e.g., LH708, 1.0 mg, 2.47 nmol) and L-cysteine (6 mg, 49.4 nmol, 20 eq.) were dissolved in 2.5 mL of ammonium hydroxide (pH 10) and the reaction mixture was stirred at room temperature under argon for 4 h or until the L-cysteine diamide disappeared as monitored by LCMS. The air was then introduced into the reaction mixture and vigorous stirring was continued overnight. The reaction mixture was then lyophilized to obtain a defined mixture of L-cystine monoamide (e.g., LH1727, 1.94 eq) with L-cystine (9.03 eq) and a small amount of L-cystine diamide (e.g., LH708, 0.03 eq). Additional purification such as cation exchange chromatography can be used to further separate the components if needed.

Example 21 Preparation of the Metastable Supersaturated Solution of L-Cystine and the Cystallizaiton Inhibition Assay For the preparation of L-cystine supersaturated solution 70 mg of L-cystine was dissolved in 100 mL of Millipore water (~3 mM) under reflux at 120° C. for 30 min until the L-cystine was completely dissolved. The supersaturated solution was then allowed to cool slowly with stirring until the oil bath temperature reached 40° C. take about 70 min depending on the lab atmosphere. To determine the L-cystine concentration all test compounds were dissolved in water to form 10 mM stock solution. Five uL of each solution was added to 495 uL L-cystine supersaturated solution. The mixtures were allowed to stand at 25° C. for 72 h. At the end of incubation, the mixtures were centrifuged at 13,000 rpm for 5 min and the supernatants were diluted 10-fold for concentration measurement. To construct the standard curves L-Cystine (2.1 mg) was dissolved in 0.1 M Na2CO3 solution (9 mL) to form a 1 mM solution as a stock solution. Then, 50 uL L-cystine stock solution was diluted to 0.6 mM with 0.1 M Na2CO3 (33.3 L) solution and to 0.4, 0.2, 0.1, 0.05 mM solution using Millipore water 75, 200, 450 and 950 uL, respectively.

Fluorescence Assay for the Determination of L-Cystine Concentration

10 μL of each L-cystine solutions or test compound diluted mixtures, 100 μL of DTT solution (12.5 mM) in 0.1 M dibasic sodium phosphate solution (1:9), were mixed at r.t. for 10 min, before the addition of 10 μL of iodoacetic acid (100 mM) and continued incubation at r.t. for an additional 15 min. This was then followed by the addition of 20 μL of OPA (100 mM in methanol)/NBC (100 mM in methanol) (1:1). The derivatization was allowed to proceed for 3 min before 3×40 μL of the mixture were placed in a 384-well plate and read at Ex 355 nm/Em 460 nm. The standard curve was repeated for each set of experiments and used to calculate the concentration of L-cystine in each sample.

Cyanide-Nitroprusside Colorimetric Assay for the Determination of L-Cystine Concentration 3×40 μL of each L-cystine solutions or test compound diluted mixtures were placed in a 96-well plate (black, clear bottom). 80 μL of aqueous solution of potassium cyanide (30% w/v) in PBS (pH=7.4) (1:7) was added to each well then the plate was left to shake at 550 rpm for 25 min. 10 μL of aqueous solution of sodium nitroprusside (20% w/v) was added to each well using automated dispenser then the plate was centrifuged immediately at 1500 rpm for 20 sec. Then the UV absorbance was measured at 530 nm using Victor 3 V plate reader. The standard curve was repeated for each plate and used to calculate the concentration of L-cystine in each sample.

TABLE 1

Aqueous Solubility of L-Cystine

| | Comp ID | Structure | $EC_{50}$ (nM) | Ratio[a] |
|---|---|---|---|---|
| 1 | LH708 | ·4HCl | 42.8 ± 0.7 | 1.00 |
| 2 | LH1729 | ·4HCl | 32.0 ± 2.5 | 1.34 |

TABLE 1-continued
Aqueous Solubility of L-Cystine
| | Comp ID | Structure | EC$_{50}$ (nM) | Ratio$^a$ |
|---|---|---|---|---|
| 3 | LH1730 | 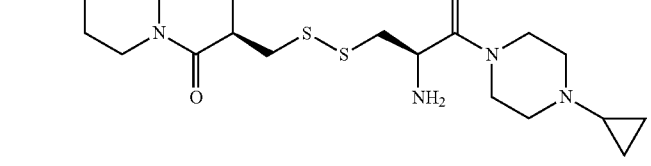 •4HCl | 68.8 ± 4.1 | 0.62 |
| 4 | LH1731 | 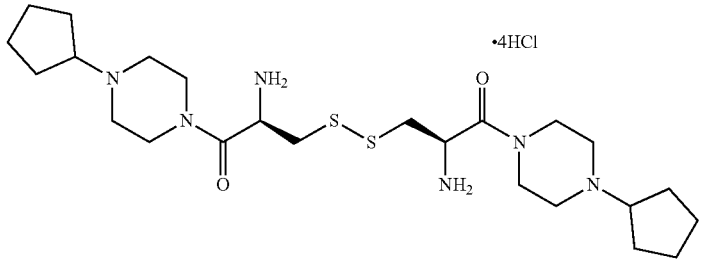 [SMILES: N[C@@H](CSSC[C@H](N)C(=O)N1CCN(C2CCCC2)CC1)C(=O)N1CCN(C2CCCC2)CC1] •4HCl | 39.5 ± 1.3 | 1.08 |
| 5 | LH1732 | 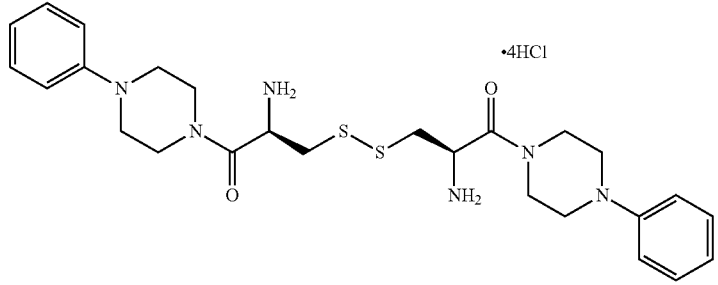 [SMILES: N[C@@H](CSSC[C@H](N)C(=O)N1CCN(c2ccccc2)CC1)C(=O)N1CCN(c2ccccc2)CC1] •4HCl | 500.3 ± 26.5 | 0.09 |
| 6 | LH1733 | 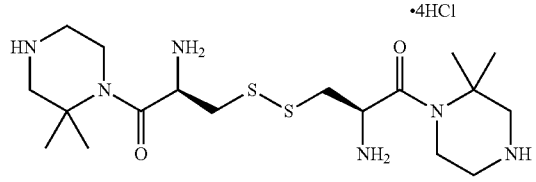 [SMILES: CC1(C)CNCCN1C(=O)[C@@H](N)CSSC[C@H](N)C(=O)N1CCNCC1(C)C] •4HCl | 108.0 ± 3.1 | 0.40 |
| 7 | LH1726 | 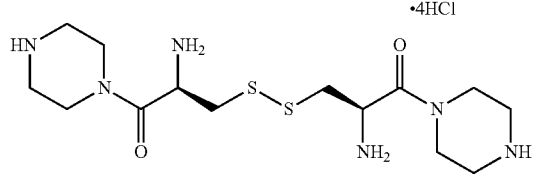 [SMILES: N[C@@H](CSSC[C@H](N)C(=O)N1CCNCC1)C(=O)N1CCNCC1] •4HCl | 52.6 ± 0.8 | 0.81 |
| 8 | LH1734 | 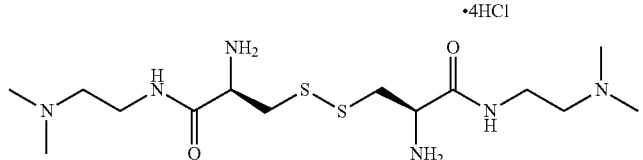 •4HCl | 163.4 ± 10.8 | 0.26 |
| 9 | LH1735 | 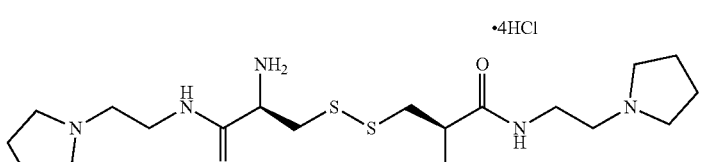 •4HCl | 116.4 ± 6.1 | 0.37 |

TABLE 1-continued

Aqueous Solubility of L-Cystine

| | Comp ID | Structure | EC$_{50}$ (nM) | Ratio[a] |
|---|---|---|---|---|
| 10 | LH1737 | ·4HCl | 142.7 ± 9.8 | 0.30 |
| 11 | LH1738 | ·4HCl | 79.7 ± 7.7 | 0.54 |
| 12 | LH1739 | ·4HCl | 114.3 ± 9.4 | 0.37 |
| 13 | LH1740 | ·4HCl | 163.3 ± 12.5 | 0.26 |
| 14 | LH1741 | ·4HCl | 160.2 ± 10.6 | 0.27 |
| 15 | LH1751 | ·4HCl | 51.2 ± 3.7 | 0.84 |
| 16 | LH1752 | ·4HCl | 36.5 ± 1.6 | 1.17 |

TABLE 1-continued

Aqueous Solubility of L-Cystine

| Comp ID | | Structure | $EC_{50}$ (nM) | Ratio[a] |
|---|---|---|---|---|
| 17 | LH1754 | •4HCl 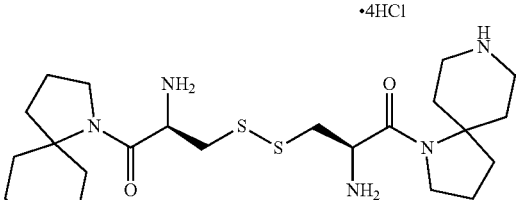 | 120.2 ± 13.0 | 0.36 |
| 18 | LH1753 | •4HCl 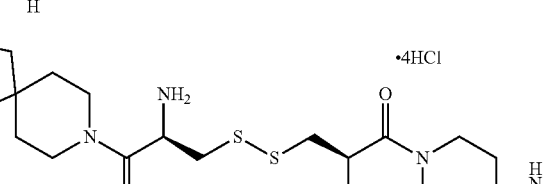 | 25.1 ± 2.4 | 1.70 |

[a]Ratio refers to the improvement in potency over the control L-cystine dimethylester (CDME).

It will be appreciated by persons skilled in the art that fibers described herein are not limited to what has been particularly shown and described. Rather, the scope of the fiber is defined by the claims which follow. It should further be understood that the above description is only representative of illustrative examples of embodiments. The description has not attempted to exhaustively enumerate all possible variations. The alternate embodiments may not have been presented for a specific portion of the fiber, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

The invention claimed is:

1. A compound, a pharmaceutically acceptable salt thereof, a solvate thereof, or a prodrug thereof, wherein the compound is represented by Formula I,

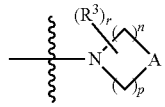

Formula I

Wherein each pair of $R^1$ and $R^2$ are independently defined as follows:

a) $R^1$ is H, $R^2$ is $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl; or b) $R^1$ and $R^2$, together with the amide nitrogen link up to form a ring of formula X-1

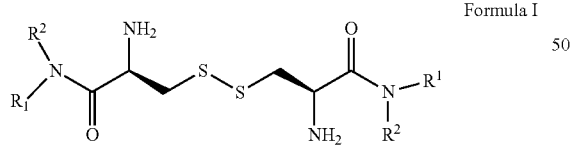

X-1 wherein
$R^3$ is $C_{1-8}$alkyl; r is 0, 1, or 2;
n, p, and A are defined as follows:
i)
n and p are independently 2 or 3;
A is $NR^e$, wherein $R^e$ is H, $C_{2-8}$alkyl or a $C_{3-8}$ cycloalkyl;
ii)
n is 0, 1, or 2; p is 2 or 3 or 4;
A is a structure of Formula Y-1

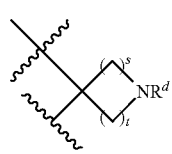

Y-1 wherein $R^d$ is H or $C_{1-8}$alkyl;
s is 0, 1, or 2; t is 2, 3 or 4; provided that when n is 0, s is 1 or 2;
or
iii)
n and p are independently 1, 2, 3 or 4;
A is $CH(CH_2)_q NR^e R^f$, wherein
$R^e$ and $R^f$ are independently $C_{1-8}$alkyl; q is 0-3;
alternatively, $R^e$ and $R^f$, together with the N they are attached to, link up to form a 4 to 8-membered heterocyclic ring;

provided that the compound is not

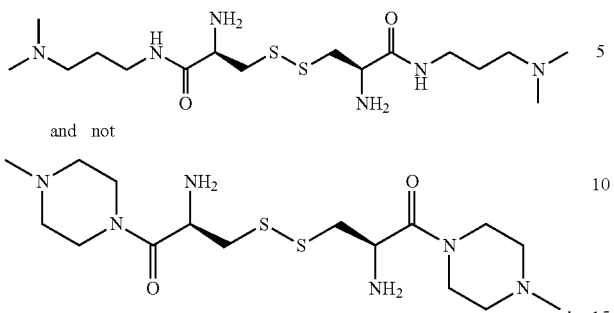

and not

2. The compound, the pharmaceutically acceptable salt thereof, the solvate thereof, or the prodrug thereof of claim 1, wherein $R^1$ is H, $R^2$ is $(CH_2)_m NR^a R^b$, m is 2 or 3; $R^a$ and $R^b$ are each independently a $C_{1-2}$alkyl.

3. The compound, the pharmaceutically acceptable salt thereof, the solvate thereof, or the prodrug thereof of claim 1, wherein $R^1$ is H, $R^2$ is $(CH_2)_m NR^a R^b$, m is 2 or 3; wherein $R^a$ and $R^b$ link up to form a 5 to 8-membered heterocyclic ring wherein a carbon in the ring is optionally replaced with O.

4. The compound, the pharmaceutically acceptable salt thereof, the solvate thereof, or the prodrug thereof of claim 1, wherein $R^1$ and $R^2$, together with the amide nitrogen link up to form the ring of formula X-1

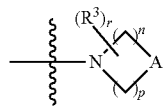

wherein r is 0, and n and p are independently 2 or 3;
A is $NR^e$, wherein $R^e$ is hydrogen, $C_{2-8}$alkyl or $C_{3-8}$ cycloalkyl.

5. The compound, the pharmaceutically acceptable salt thereof, the solvate thereof, or the prodrug thereof of claim 4, wherein n and p are independently 2, and $R^e$ is selected from the group consisting of tert-butyl, cyclopropyl, cyclobutyl, and cyclopentyl.

6. The compound, the pharmaceutically acceptable salt thereof, the solvate thereof, or the prodrug thereof of claim 1, wherein $R^1$ and $R^2$, together with the amide nitrogen link up to form a ring of formula X-1

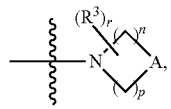

wherein r is 0, A is Formula Y-1

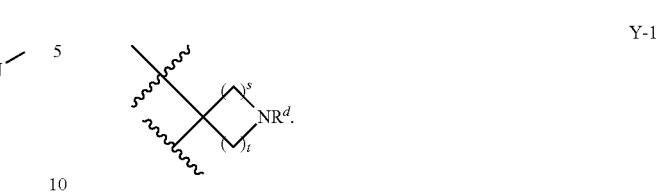

7. The compound, the pharmaceutically acceptable salt thereof, the solvate thereof, or the prodrug thereof of claim 6, wherein n is 0, s is 1 or 2.

8. The compound, the pharmaceutically acceptable salt thereof, the solvate thereof, or the prodrug thereof of claim 6, wherein n is 1 or 2, s is 0, 1 or 2.

9. The compound, the pharmaceutically acceptable salt thereof, the solvate thereof, or the prodrug thereof of claim 1, wherein $R^1$ and $R^2$, together with the amide nitrogen link up to form a ring of formula X-1

r is 0; n and p are independently 1, 2, 3 or 4;
A is $CH(CH_2)_q NR^e R^f$, wherein $R^e$ and $R^f$ are independently $C_{1-8}$alkyl; q is 0-3.

10. The compound, the pharmaceutically acceptable salt thereof, the solvate thereof, or the prodrug thereof of claim 1, wherein $R^1$ and $R^2$, together with the amide nitrogen link up to form a ring of formula X-1

Wherein r is 0;
A is $CH(CH_2)_q NR^e R^f$, wherein q is 0; $R^e$ and $R^f$, together with the N they are attached to, link up to form a 4 to 8-membered heterocyclic ring.

11. The compound, the pharmaceutically acceptable salt thereof, the solvate thereof, or the prodrug thereof of claim 1, wherein the compound is selected from the group consisting of

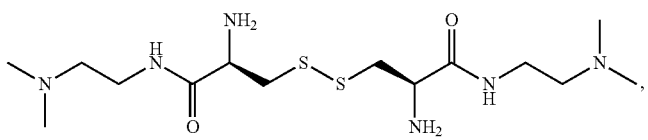

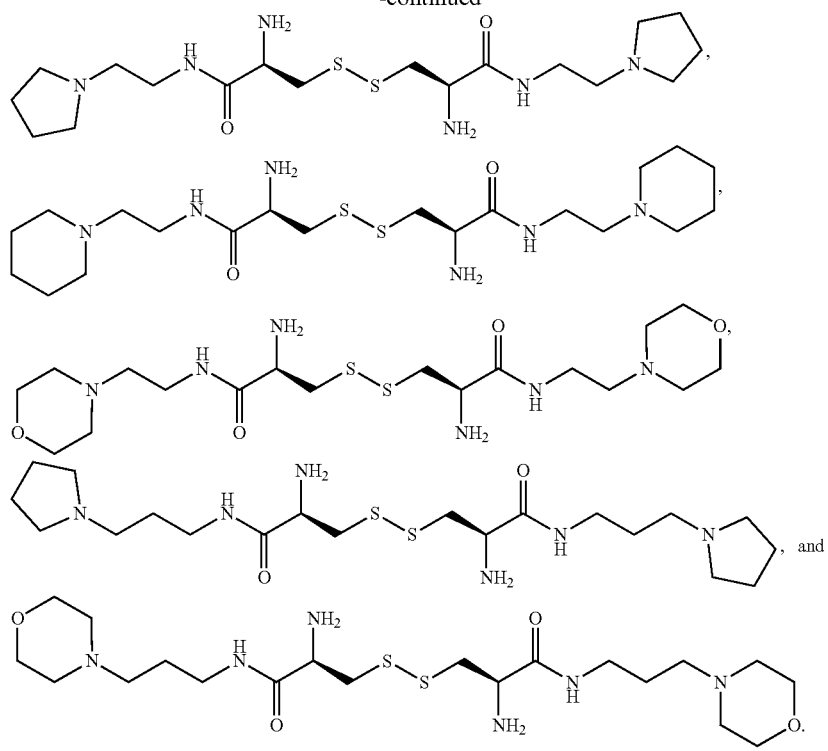
12. The compound, the pharmaceutically acceptable salt thereof, the solvate thereof, or the prodrug thereof of claim 1, wherein the compound is selected from the group consisting of:
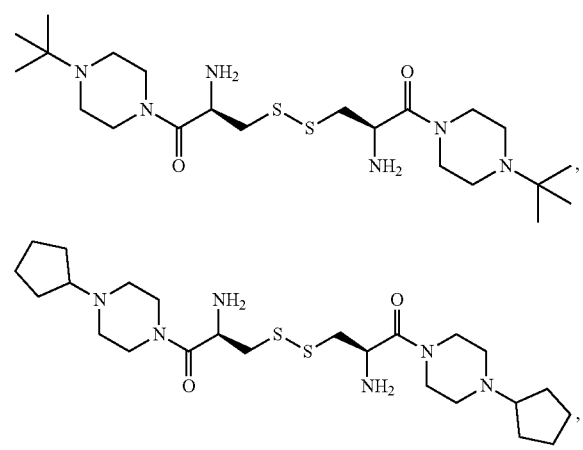
13. The compound, the pharmaceutically acceptable salt thereof, the solvate thereof, or the prodrug thereof of claim 1, wherein the compound is selected from the group consisting of
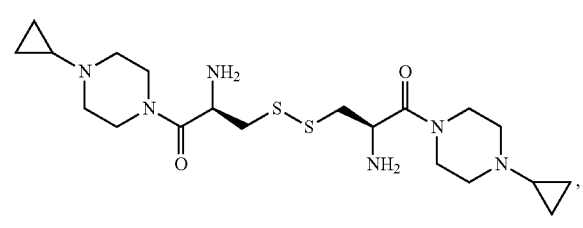
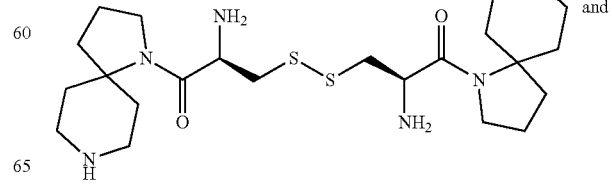

-continued

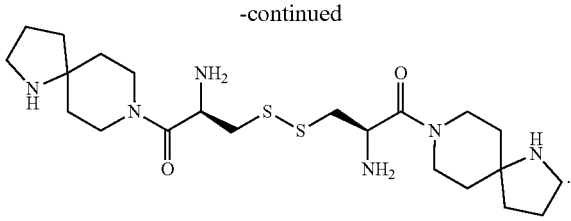

14. A pharmaceutical composition comprising a therapeutically effective amount of a compound represented by Formula I, the pharmaceutically acceptable salt thereof, the solvate thereof, or the prodrug thereof and at least a pharmaceutically acceptable carrier, Formula I

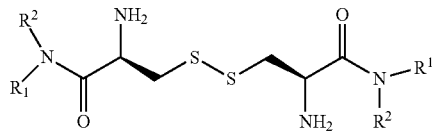

Wherein each pair of $R^1$ and $R^2$ are independently defined as follows:
a) $R^1$ is H, $R^2$ is $(CH_2)_m NR^a R^b$, m is 2, 3 or 4; wherein $R^a$ and $R^b$ are each independently a $C_{1-8}$alkyl, alternatively $R^a$ and $R^b$ together with the N they are attached to, link up to form a 4 to 8-membered heterocyclic ring, wherein a carbon in the 4 to 8-membered heterocyclic ring is optionally replaced with a heteroatom selected from the group consisting of O, S, NH, and N $C_{1-8}$alkyl;
or
b) $R^1$ and $R^2$, together with the amide nitrogen link up to form a ring of formula X-1

X-1

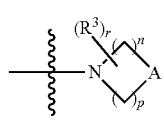

wherein
$R^3$ is $C_{1-8}$alkyl; r is 0, 1, or 2;
n, p, and A are defined as follows:
i)
n and p are independently 2 or 3;
A is $NR^e$, wherein $R^e$ is H, $C_{2-8}$alkyl or a $C_{3-8}$ cycloalkyl;
ii)
n is 0, 1, or 2; p is 2 or 3 or 4;
A is a structure of Formula Y-1

Y-1

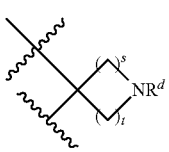

wherein $R^d$ is H or $C_{1-8}$alkyl;
s is 0, 1, or 2; t is 2, 3 or 4; provided that when n is 0, s is 1 or 2;
or
iii)
n and p are independently 1, 2, 3 or 4;
A is $CH(CH_2)_q NR^e R^f$, wherein
$R^e$ and $R^f$ are independently $C_{1-8}$alkyl; q is 0-3;
alternatively, $R^e$ and $R^f$ together with the N they are attached to, link up to form a 4 to 8-membered heterocyclic ring;
provided that the compound is not

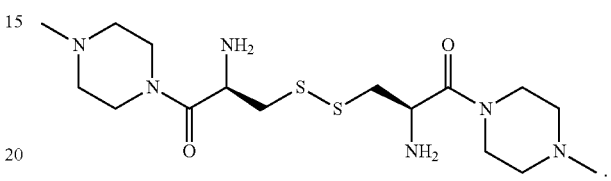

15. The pharmaceutical composition of claim 14, wherein the pharmaceutically acceptable salt is a hydrochloric acid salt.

16. A method of treating a disease associated with a mutation at SLC3A1 gene and/or SLC7A9 gene, comprising administering to a subject having said disease a pharmaceutically effective amount of the pharmaceutical composition of claim 14.

17. The method of claim 16, wherein the disease is cystinuria.

18. The method of claim 16, wherein the subject is a human.

19. The method of claim 16, further comprising administering to the subject a secondary agent selected from the group consisting of citrate supplementation, acetazolamide, and chelation agent.

20. The compound, the pharmaceutically acceptable salt thereof, the solvate thereof, or the prodrug thereof of claim 1, wherein the compound is selected from the group consisting of

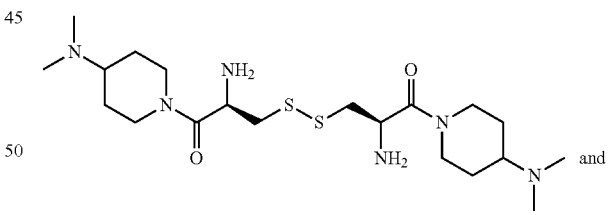 and

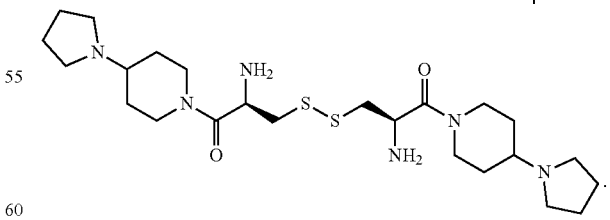

* * * * *